(12) United States Patent
Zhang et al.

(10) Patent No.: US 12,058,739 B2
(45) Date of Patent: Aug. 6, 2024

(54) TECHNIQUES FOR LARGE ROUND TRIP TIMES IN RANDOM ACCESS CHANNEL PROCEDURES

(71) Applicant: QUALCOMM INCORPORATED, San Diego, CA (US)

(72) Inventors: Xiaoxia Zhang, San Diego, CA (US); Jing Sun, San Diego, CA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 368 days.

(21) Appl. No.: 17/455,003

(22) Filed: Nov. 15, 2021

(65) Prior Publication Data

US 2023/0156803 A1    May 18, 2023

(51) Int. Cl.
*H04W 74/0833* (2024.01)
*H04L 1/08* (2006.01)
*H04W 72/23* (2023.01)

(52) U.S. Cl.
CPC ........... *H04W 74/0833* (2013.01); *H04L 1/08* (2013.01); *H04W 72/23* (2023.01)

(58) Field of Classification Search
CPC ...... H04W 74/0833; H04W 72/23; H04L 1/08
USPC ......................................................... 370/329
See application file for complete search history.

(56) References Cited

U.S. PATENT DOCUMENTS

| | | | | |
|---|---|---|---|---|
| 11,805,547 | B2 * | 10/2023 | Golitschek Edler von Elbwart ... | H04W 72/0446 |
| 2012/0113939 | A1 * | 5/2012 | Kim ..................... | H04W 74/006 370/329 |
| 2019/0124181 | A1 * | 4/2019 | Park ....................... | H04W 36/08 |
| 2020/0068619 | A1 * | 2/2020 | Kim ..................... | H04W 74/006 |
| 2021/0266978 | A1 * | 8/2021 | Sakhnini ................. | H04L 5/001 |
| 2021/0289559 | A1 * | 9/2021 | Sakhnini ............. | H04W 74/008 |
| 2022/0015150 | A1 * | 1/2022 | Ye ....................... | H04W 74/0833 |
| 2022/0086897 | A1 * | 3/2022 | Wei .................... | H04W 74/0833 |
| 2022/0140881 | A1 * | 5/2022 | Zhang .................. | H04B 7/0695 370/329 |
| 2022/0150950 | A1 * | 5/2022 | Islam .................... | H04L 1/1896 |
| 2022/0191935 | A1 * | 6/2022 | Xiong ............... | H04W 74/0833 |

(Continued)

OTHER PUBLICATIONS

International Search Report and Written Opinion—PCT/US2022/078456—ISA/EPO—Jan. 24, 2023.

(Continued)

*Primary Examiner* — Anthony Mejia
(74) *Attorney, Agent, or Firm* — Holland & Hart LLP

(57) ABSTRACT

Methods, systems, and devices for wireless communications are described. A first wireless device may receive, from a second wireless device, a first message of a random access channel procedure. The first message may include a preamble having a cyclic prefix and a set of sequences. The first wireless device may transmit a second message of the random access channel procedure indicating a first timing parameter for subsequent communications between the devices. The first wireless device may transmit a third message to the second wireless device that indicates a second timing parameter. In some cases, the second wireless device may receive control signaling from the first wireless device indicating a timing offset for the first message of the random access channel procedure. The second wireless device may transmit the first message using the timing offset in response to receiving the control signaling.

30 Claims, 17 Drawing Sheets

(56) References Cited

U.S. PATENT DOCUMENTS

2022/0418003 A1\* 12/2022 Park .................... H04W 74/006
2023/0029663 A1\* 2/2023 Abedini ............ H04W 74/0891
2023/0126013 A1\* 4/2023 Pinayour Chandrasekaran ..........
H04W 74/008
370/329

OTHER PUBLICATIONS

ZTE Corporation., et al., "Consideration on MAC Enhancements for NTN", 3GPP TSG RAN WG2 Meeting #111-e, R2-2007784, 3rd Generation Partnership Project, Mobile Competence Centre, 650, Route Des Lucioles, F-06921 Sophia-Antipolis Cedex, France, vol. RAN WG2, No. Electronic meeting, Aug. 17, 2020-Aug. 28, 2020, Aug. 7, 2020, 12 Pages, XP051912409, paragraph [2.1.3], figure 3.

\* cited by examiner

TECHNIQUES FOR LARGE ROUND TRIP TIMES IN RANDOM ACCESS CHANNEL PROCEDURES

INTRODUCTION

The following relates to wireless communications, and more specifically to managing round trip times in wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communications at a first wireless device is described. The method may include receiving a first message of a random access channel procedure from a second wireless device, the first message including a preamble having a cyclic prefix and a set of sequences, transmitting a second message of the random access channel procedure to the second wireless device, the second message indicating a first timing parameter for at least a portion of subsequent communications between the first wireless device and the second wireless device, the first timing parameter based on the preamble of the first message, and transmitting a third message to the second wireless device indicating a second timing parameter.

An apparatus for wireless communications at a first wireless device is described. The apparatus may include a processor and memory coupled to the processor, the processor and memory configured to receive a first message of a random access channel procedure from a second wireless device, the first message including a preamble having a cyclic prefix and a set of sequences, transmit a second message of the random access channel procedure to the second wireless device, the second message indicating a first timing parameter for at least a portion of subsequent communications between the first wireless device and the second wireless device, the first timing parameter based on the preamble of the first message, and transmit a third message to the second wireless device indicating a second timing parameter.

Another apparatus for wireless communications at a first wireless device is described. The apparatus may include means for receiving a first message of a random access channel procedure from a second wireless device, the first message including a preamble having a cyclic prefix and a set of sequences, means for transmitting a second message of the random access channel procedure to the second wireless device, the second message indicating a first timing parameter for at least a portion of subsequent communications between the first wireless device and the second wireless device, the first timing parameter based on the preamble of the first message, and means for transmitting a third message to the second wireless device indicating a second timing parameter.

A non-transitory computer-readable medium storing code for wireless communications at a first wireless device is described. The code may include instructions executable by a processor to receive a first message of a random access channel procedure from a second wireless device, the first message including a preamble having a cyclic prefix and a set of sequences, transmit a second message of the random access channel procedure to the second wireless device, the second message indicating a first timing parameter for at least a portion of subsequent communications between the first wireless device and the second wireless device, the first timing parameter based on the preamble of the first message, and transmit a third message to the second wireless device indicating a second timing parameter.

In some examples of the method, apparatuses, and non-transitory computer-readable medium described herein, the first timing parameter corresponds to a first symbol associated with a first sequence of the set of sequences and the second timing parameter corresponds to a second symbol associated with a second sequence of the set of sequences.

In some examples of the method, apparatuses, and non-transitory computer-readable medium described herein, transmitting the third message may include operations, features, means, or instructions for retransmitting the second message of the random access channel procedure indicating the second timing parameter based on failing to receive a response to the second message.

Some examples of the method, apparatuses, and non-transitory computer-readable medium described herein may further include operations, features, means, or instructions for retransmitting the second message of the random access channel procedure indicating a third timing parameter based on failing to receive a response to the third message.

In some examples of the method, apparatuses, and non-transitory computer-readable medium described herein, transmitting the third message may include operations, features, means, or instructions for transmitting, to the second wireless device, a grant for a retransmission of a response to the second message based on failing to receive the response to the second message, the grant indicating the second timing parameter.

Some examples of the method, apparatuses, and non-transitory computer-readable medium described herein may further include operations, features, means, or instructions for transmitting a second grant for a second retransmission of the response to the second message based on failing to receive the response to the third message, the second grant indicating a third timing parameter.

Some examples of the method, apparatuses, and non-transitory computer-readable medium described herein may further include operations, features, means, or instructions for receiving the response to the second message using the second timing parameter, where transmitting the third message indicating the second timing parameter may be based on receiving the response to the second message using the second timing parameter.

In some examples of the method, apparatuses, and non-transitory computer-readable medium described herein, the third message includes a last message of the random access channel procedure.

In some examples of the method, apparatuses, and non-transitory computer-readable medium described herein, receiving the response to the second message may include operations, features, means, or instructions for attempting to receive the response using the first timing parameter and receiving the response using the second timing parameter based on failing to receive the response using the first timing parameter.

Some examples of the method, apparatuses, and non-transitory computer-readable medium described herein may further include operations, features, means, or instructions for receiving the response using the second timing parameter may be based on one or more reference signals of the response.

Some examples of the method, apparatuses, and non-transitory computer-readable medium described herein may further include operations, features, means, or instructions for communicating one or more messages of the random access channel procedure via dedicated resources based on the second wireless device being a threshold distance from the first wireless device.

A method for wireless communications at a second wireless device is described. The method may include transmitting a first message of a random access channel procedure to a first wireless device, the first message including a preamble having a cyclic prefix and a set of sequence, receiving a second message of the random access channel procedure from the first wireless device, the second message indicating a first timing parameter for subsequent communications between the first wireless device and the second wireless device, the first timing parameter based on the preamble of the first message, and receiving a third message from the first wireless device based on the first wireless device attempting to receive a response to the second message, the third message indicating a second timing parameter.

An apparatus for wireless communications at a second wireless device is described. The apparatus may include a processor and memory coupled to the processor, the processor and memory configured to transmit a first message of a random access channel procedure to a first wireless device, the first message including a preamble having a cyclic prefix and a set of sequence, receive a second message of the random access channel procedure from the first wireless device, the second message indicating a first timing parameter for subsequent communications between the first wireless device and the second wireless device, the first timing parameter based on the preamble of the first message, and receive a third message from the first wireless device based on the first wireless device attempting to receive a response to the second message, the third message indicating a second timing parameter.

Another apparatus for wireless communications at a second wireless device is described. The apparatus may include means for transmitting a first message of a random access channel procedure to a first wireless device, the first message including a preamble having a cyclic prefix and a set of sequence, means for receiving a second message of the random access channel procedure from the first wireless device, the second message indicating a first timing parameter for subsequent communications between the first wireless device and the second wireless device, the first timing parameter based on the preamble of the first message, and means for receiving a third message from the first wireless device based on the first wireless device attempting to receive a response to the second message, the third message indicating a second timing parameter.

A non-transitory computer-readable medium storing code for wireless communications at a second wireless device is described. The code may include instructions executable by a processor to transmit a first message of a random access channel procedure to a first wireless device, the first message including a preamble having a cyclic prefix and a set of sequence, receive a second message of the random access channel procedure from the first wireless device, the second message indicating a first timing parameter for subsequent communications between the first wireless device and the second wireless device, the first timing parameter based on the preamble of the first message, and receive a third message from the first wireless device based on the first wireless device attempting to receive a response to the second message, the third message indicating a second timing parameter.

In some examples of the method, apparatuses, and non-transitory computer-readable medium described herein, the first timing parameter corresponds to a first symbol associated with a first sequence of the set of sequences and the second timing parameter corresponds to a second symbol associated with a second sequence of the set of sequences.

In some examples of the method, apparatuses, and non-transitory computer-readable medium described herein, receiving the third message may include operations, features, means, or instructions for receiving a retransmission of the second message of the random access channel procedure indicating the second timing parameter based on the first wireless device failing to receive the response to the second message.

Some examples of the method, apparatuses, and non-transitory computer-readable medium described herein may further include operations, features, means, or instructions for transmitting a response to the third message and receiving a second retransmission of the second message of the random access channel procedure indicating a third timing parameter based on the first wireless device failing to receive the response to the third message.

In some examples of the method, apparatuses, and non-transitory computer-readable medium described herein, receiving the third message may include operations, features, means, or instructions for receiving, from the first wireless device, a grant for a retransmission of the response to the second message based on the first wireless device failing to receive the response to the second message, the grant indicating the second timing parameter.

Some examples of the method, apparatuses, and non-transitory computer-readable medium described herein may further include operations, features, means, or instructions for receiving a second grant for a second retransmission of the response to the second message based on failing to receive the response to the third message, the second grant indicating a third timing parameter.

In some examples of the method, apparatuses, and non-transitory computer-readable medium described herein, receiving the third message may include operations, features, means, or instructions for transmitting the response to the second message using the first timing parameter, where receiving the third message indicating the second timing parameter may be based on transmitting the response to the second message using the first timing parameter.

In some examples of the method, apparatuses, and non-transitory computer-readable medium described herein, the third message includes a last message of the random access channel procedure.

Some examples of the method, apparatuses, and non-transitory computer-readable medium described herein may further include operations, features, means, or instructions for receiving the response using the second timing parameter may be based on one or more reference signals of the response.

Some examples of the method, apparatuses, and non-transitory computer-readable medium described herein may further include operations, features, means, or instructions for transmitting a response to the third message using the second timing parameter and receiving a fourth message from the first wireless device based on whether the first wireless device receives the response to the third message, the fourth message indicating a third timing parameter.

Some examples of the method, apparatuses, and non-transitory computer-readable medium described herein may further include operations, features, means, or instructions for communicating one or more messages of the random access channel procedure via dedicated resources based on the second wireless device being a threshold distance from the first wireless device.

A method for wireless communications at a first wireless device is described. The method may include receiving a first message of a random access channel procedure from a second wireless device, the first message including a preamble having a cyclic prefix and a set of sequences and transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

An apparatus for wireless communications at a first wireless device is described. The apparatus may include a processor and memory coupled to the processor, the processor and memory configured to receive a first message of a random access channel procedure from a second wireless device, the first message including a preamble having a cyclic prefix and a set of sequences and transmit a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

Another apparatus for wireless communications at a first wireless device is described. The apparatus may include means for receiving a first message of a random access channel procedure from a second wireless device, the first message including a preamble having a cyclic prefix and a set of sequences and means for transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

A non-transitory computer-readable medium storing code for wireless communications at a first wireless device is described. The code may include instructions executable by a processor to receive a first message of a random access channel procedure from a second wireless device, the first message including a preamble having a cyclic prefix and a set of sequences and transmit a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

In some examples of the method, apparatuses, and non-transitory computer-readable medium described herein, the first symbol duration adjustment corresponds to a first sequence of the set of sequences and the second symbol duration adjustment correspond to a second sequence of the set of sequences.

Some examples of the method, apparatuses, and non-transitory computer-readable medium described herein may further include operations, features, means, or instructions for receiving the first message using the first timing parameter having the first symbol duration adjustment to obtain the first energy metric and receiving the first message using the second timing parameter having the second symbol duration adjustment to obtain the second energy metric.

Some examples of the method, apparatuses, and non-transitory computer-readable medium described herein may further include operations, features, means, or instructions for communicating one or more messages of the random access channel procedure via dedicated resources based on the second wireless device being a threshold distance from the first wireless device.

A method for wireless communications at a second wireless device is described. The method may include receiving control signaling from a first wireless device indicating that a timing offset for a first message of a random access channel procedure is enabled, transmitting, to the first wireless device, the first message of the random access channel procedure having the timing offset in response to receiving the control signaling, the first message including a preamble having a cyclic prefix and a set of sequences, and receiving a second message of the random access channel procedure from the first wireless device indicating a timing parameter based on transmitting the first message.

An apparatus for wireless communications at a second wireless device is described. The apparatus may include a processor and memory coupled to the processor, the processor and memory configured to receive control signaling from a first wireless device indicating that a timing offset for a first message of a random access channel procedure is enabled, transmit, to the first wireless device, the first message of the random access channel procedure having the timing offset in response to receiving the control signaling, the first message including a preamble having a cyclic prefix and a set of sequences, and receive a second message of the random access channel procedure from the first wireless device indicating a timing parameter based on transmitting the first message.

Another apparatus for wireless communications at a second wireless device is described. The apparatus may include means for receiving control signaling from a first wireless device indicating that a timing offset for a first message of a random access channel procedure is enabled, means for transmitting, to the first wireless device, the first message of the random access channel procedure having the timing offset in response to receiving the control signaling, the first message including a preamble having a cyclic prefix and a set of sequences, and means for receiving a second message of the random access channel procedure from the first wireless device indicating a timing parameter based on transmitting the first message.

A non-transitory computer-readable medium storing code for wireless communications at a second wireless device is described. The code may include instructions executable by a processor to receive control signaling from a first wireless device indicating that a timing offset for a first message of a random access channel procedure is enabled, transmit, to the first wireless device, the first message of the random access channel procedure having the timing offset in response to receiving the control signaling, the first message including a preamble having a cyclic prefix and a set of sequences, and receive a second message of the random access channel procedure from the first wireless device indicating a timing parameter based on transmitting the first message.

Some examples of the method, apparatuses, and non-transitory computer-readable medium described herein may further include operations, features, means, or instructions for receiving a third message from the first wireless device indicating a second timing parameter, the third message including a grant for a retransmission of a response to the second message of the random access procedure and transmitting the response using the timing offset, the timing parameter, the second timing parameter, or any combination thereof.

In some examples of the method, apparatuses, and non-transitory computer-readable medium described herein, the timing offset includes a symbol duration adjustment relative to a start of a first sequence of the set of sequences based on location information associated with the second wireless device.

In some examples of the method, apparatuses, and non-transitory computer-readable medium described herein, the control signaling includes remaining minimum system information signaling.

DETAILED DESCRIPTION

Figure 1:
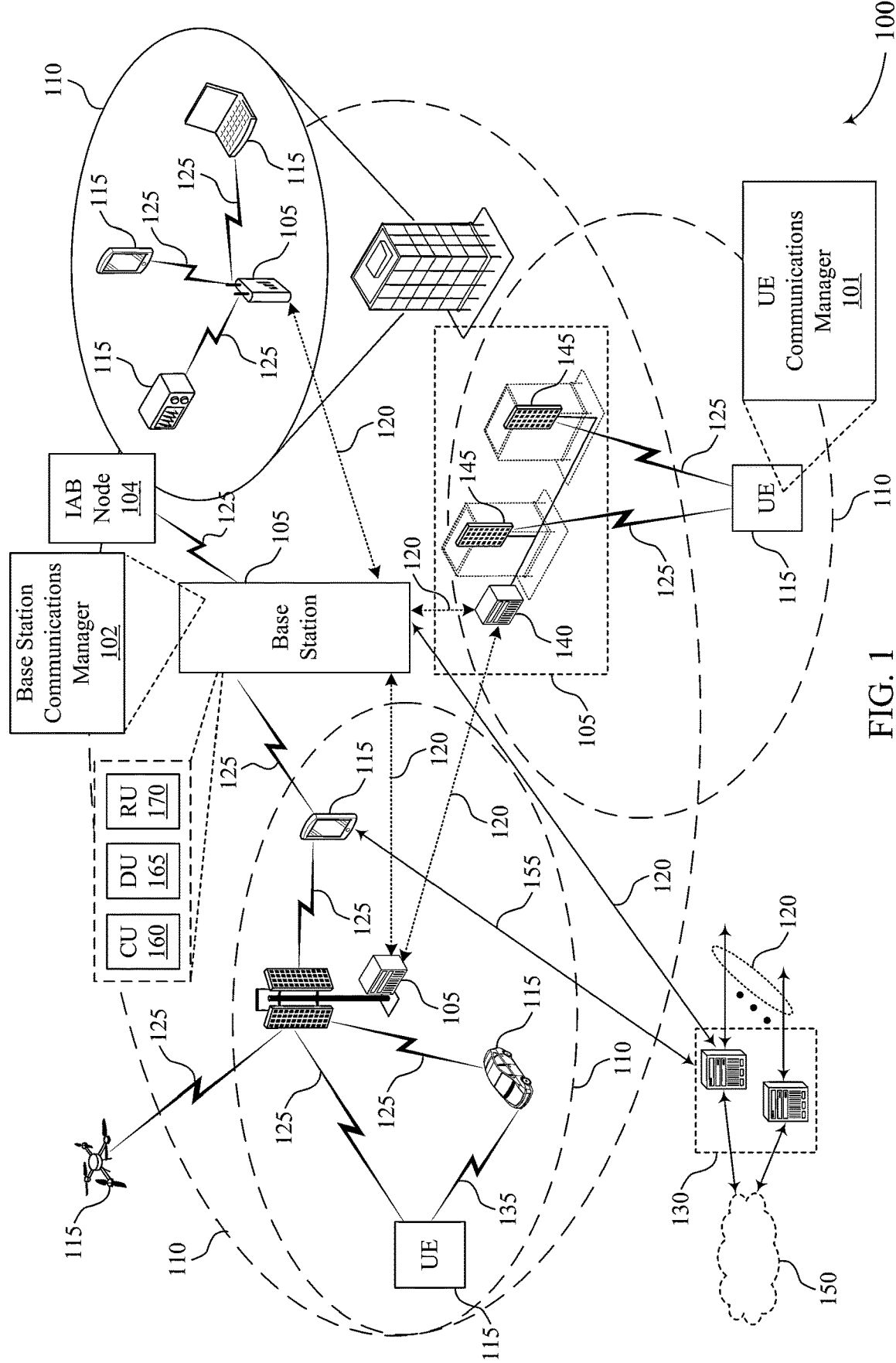
FIG. 1 illustrates an example of a wireless communications system that supports techniques for large round trip times in random access channel procedures in accordance with one or more aspects of the present disclosure.

A wireless communications system may include wireless communications devices, such as a user equipment (UE) and a base station (e.g., an eNodeB (eNB), a next-generation NodeB or a giga-NodeB, either of which may be referred to as a gNB, or some other base station), that support access procedures and timing adjustment (TA) techniques. A TA may be referred to as a timing parameter, a timing advance, and the like. A device may use a random access channel (RACH) to access a network for communications with other devices. As part of a RACH procedure, two devices may identify or otherwise indicate a TA, which may enable the devices to correctly account for timing differences when decoding signals (e.g., the TA may indicate a timing offset between transmitting and receiving communications due to a round trip time (RTT) for the communications). In some cases, the RTT may be smaller than a duration of a sequence of a RACH preamble. A RACH preamble may be included in a first message of a RACH procedure (e.g., the RACH preamble may initiate the RACH procedure). For example, the RACH preamble may include a cyclic prefix, one or more sequences (e.g., a series of symbols or bits associated with a respective preamble format), or any combination thereof, and the RACH preamble may be used to obtain synchronization (e.g., uplink synchronization) with another device such as a base station. In some examples, a RACH procedure as described herein may be an example of a contention based RACH procedure or a non-contention based RACH procedure. As a result, a device (e.g., a base station) may correctly determine a TA for communications between the two devices. However, in some cases, devices may experience a relatively large RTT. For example, a first device may be located relatively far from a second device. As a result, the devices may be unable to account for or resolve timing differences in the communications, due to the RTT having a duration (e.g., a multiple symbol duration) that extends past a boundary of one or more sequences in the RACH preamble, which may result in processing errors, decoding errors, or both.

The techniques described herein may enable wireless devices to account for relatively large timing differences (e.g., timing differences due to a relatively large RTT for communications between the devices). The wireless devices may include or be examples of UEs (e.g., customer-premises equipment (CPE) or other UEs), base stations, integrated access and backhaul (IAB) nodes, or any combination thereof. In some examples, a first wireless device may send a first RACH message of a RACH procedure (e.g., RACH msg 1) to a second wireless device which includes a RACH preamble. For example, the first RACH message may initiate the RACH procedure to establish communications with the second wireless device. In response to receiving the first RACH message from the first wireless device, the second wireless device may determine a TA for subsequent communications based on the contents of the first RACH message (e.g., the preamble may include a cyclic prefix, a set of sequences, a guard time, or a combination thereof). The second wireless device may transmit a second RACH message of the RACH procedure (e.g., RACH msg 2) to the first wireless device indicating the determined TA.

The second wireless device may attempt to detect the RACH preamble using different TA values, which may enable the second wireless device to estimate a relatively accurate TA (e.g., a TA that accounts for a timing delay that spans past one or more sequence boundaries, for example, due to a relatively large RTT). The second wireless device may attempt to detect or decode the preamble using a first TA (e.g., a TA corresponding to a first sequence or symbol of the preamble), a second TA including an additional quantity of symbols (e.g., a TA+N symbols corresponding to a second sequence or symbol of the preamble), a third TA (e.g., a TA+2N symbols), and so on. The second wireless device may determine energy metrics associated with each of the one or more TAs and select a TA that satisfies a threshold. For example, the second wireless device may select a TA to indicate to the first wireless device in the second RACH message based on the TA corresponding to a highest energy metric (e.g., a received power) of a set of energy metrics each associated with a respective TA.

In some examples, the second wireless device may retransmit the second message one or more times, for example, based on whether a response to the second message is received from the first wireless device (e.g., the response may be a third RACH message of the RACH procedure). As an example, the second wireless device may fail to receive the response and retransmits the second message using various TAs based on failing to successfully receive or decode the response. Each retransmission may indicate a different TA (e.g., the second message may indicate TA, a first retransmission of the second message may indicate TA+N, a second retransmission of the second message may indicate TA+2N, etc.). The second wireless device may continue retransmitting the second message, and the first wireless device may monitor for the second message, until a response is successfully received at the second wireless device, or until a threshold quantity of retransmissions or a threshold duration for retransmissions is satisfied. The second wireless device may transmit one or more grants for a retransmission of the response (e.g., the second wireless device may transmit a grant indicating resources for the first wireless device to retransmit the third message of the RACH procedure using a different TA indicated in the grant). Each grant may indicate a different TA (e.g., TA+N), for example, until a response using one of the TAs indicated by a grant is successfully received.

In some examples, the second wireless device may indicate a TA or an adjustment to a TA in a fourth message of the RACH procedure (e.g., msg4). For example, if the second wireless device does not successfully receive or decode a response to the second message using the TA indicated in the second message, the second wireless device may attempt to receive the response using one or more different TAs. For example, the first wireless device may be configured to retransmit the third message until the first wireless device receives the fourth message in response to a transmission or retransmission of the third message, or until a threshold quantity of retransmissions or a threshold duration is satisfied. The second wireless device may attempt to detect or decode the response using the first TA (e.g., a TA corresponding to a first sequence or symbol of the preamble). If the second wireless device does not successfully receive the response, the second wireless device may attempt to detect or decode the response (e.g., retransmissions of the response) using one or more different TAs (e.g., the second wireless device may use the first TA in addition to a symbol level TA adjustment). In some examples, the second wireless device may apply the different TAs to one or more reference signals (e.g., one or more demodulation reference signals (DMRS)) of the response, which may enable the second wireless device to detect the response without attempting to decode the full response multiple times. The second wireless device may transmit a third message (e.g., the third message may be a last message of the RACH procedure such as a fourth RACH message of the RACH procedure) to the first wireless device indicating a second TA based on the second TA being associated with the successful reception of the response.

In some examples, the first wireless device may adjust a timing of the first RACH message (e.g., prior to receiving a TA indication from the second wireless device). For example, the second wireless device may transmit control signaling to the first wireless device, indicating that a timing offset is enabled for the first message of the RACH procedure (e.g., RACH msg 1). In some examples, the control signaling may include remaining minimum system information (RMSI) signaling. In response to the control signaling, the first wireless device may transmit the first message, including the RACH preamble, using the enabled timing offset. In some examples, the timing offset may be based on location information associated with the first wireless device. For example, the first wireless device may determine or otherwise be configured with a timing offset for the first RACH message that accounts for a RTT (e.g., the first wireless device may estimate the timing offset using a distance from the first wireless device to the second wireless device). The timing offset may include a symbol duration adjustment relative to a start of a first sequence within the RACH preamble's set of sequences. Based on transmitting the first message, the first wireless device may receive the second message of the RACH procedure (e.g., RACH msg 2) from the second wireless device indicating a first TA. In some examples, the first wireless device may transmit a response (e.g., the third message of the RACH procedure) to the second message of the RACH procedure using the combination of the first TA and the timing offset.

The subject matter described in the present disclosure may be implemented such that a wireless communications system may realize reduced power consumption, efficient communications, and the like. For example, configuring the communication devices to support large round trip times in random access channel procedures as described herein may result in decreased system latency, reliable decoding of messages using a TA that accounts for such large RTTs, or both. In some examples of the techniques described herein, the devices may use resources dedicated for such techniques. As an example, resources may be configured (e.g., via control signaling) for devices having location information indicating that a threshold distance between the devices satisfies a threshold. Thus, in some such cases, the wireless devices may implement the techniques accounting for RTTs when communicating on the dedicated resources, which may result in reduced processing or signaling overhead.

Aspects of the disclosure are initially described in the context of wireless communications systems. Examples of processes and signaling exchanges that support large round trip times in random access channel procedures are then described. Aspects of the disclosure are further illustrated by and described with reference to apparatus diagrams, system diagrams, and flowcharts that relate to techniques for large round trip times in random access channel procedures.

FIG. 1 illustrates an example of a wireless communications system 100 that supports techniques for large round trip times in random access channel procedures in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, IAB nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, for example in the range of 300 megahertz (MHz) to 300 gigahertz (GHz). The region from 300 MHz to 3 GHz is often known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FRE or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the medium access control (MAC) layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 175 is flexible and as such gives rise to numerous permutations of different functionalities depending upon which functions (e.g., MAC functions, baseband functions, radio frequency functions, and any combinations thereof) are performed at the CU 160, DU 165, and RU 175. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more TAB nodes 104 may be configured as (e.g., or in communication according to) some relay chain.

For instance, an access network (AN) or RAN may refer to communications between access nodes (e.g., IAB donor), TAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and TAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

TAB nodes 104 may refer to a RAN node that provides TAB functionality (e.g., access for UEs 115, wireless self-backhauling capabilities, etc.). TAB nodes 104 may include a DU 165 and an MT. A DU 165 may act as a distributed scheduling node towards child nodes associated with the TAB node 104, and the MT may act as a scheduled node towards parent nodes associated with the TAB node 104. That is, an IAB donor may be referred to as a parent node in communication with one or more child nodes (e.g., an IAB donor may relay transmissions for UEs through one or more other TAB nodes 104). Additionally, an TAB node 104 may also be referred to as a parent node or a child node to other TAB nodes 104, depending on the relay chain or configuration of the AN. Therefore, the MT entity of TAB nodes 104 (e.g., MTs) may provide a Uu interface for a child node to receive signaling from a parent TAB node 104, and the DU interface (e.g., DUs 165) may provide a Uu interface for a parent node to signal to a child TAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for large round trip times in random access channel procedures as described herein. For example, some operations described as being performed by a UE 115 or a base station 105 may additionally or alternatively be performed by components of the disaggregated RAN architecture (e.g., IAB nodes, DUs, CUs, etc.).

In the wireless communications system 100 a UE 115 and a base station 105 (e.g., an eNodeB (eNB), a next-generation NodeB or a giga-NodeB, either of which may be referred to as a gNB, or some other base station), may support wireless communications over one or multiple radio access technologies. Examples of radio access technologies include 4G systems, such as LTE systems, and 5G systems, which may be referred to as NR systems. The wireless communications system 100 may be configured to support techniques for TA indications, adjustments, or both as described herein. For example, one or more devices may include a UE communications manager 101, a base station communications manager 102, or any combination thereof, which may be examples of communications managers as described herein with reference to FIGS. 6-17. The UE 115 and the base station 105 may perform, via the communications managers, a multi-step RACH procedure. For example, the UE 115 may transmit, via the communications manager 101, a first message of a RACH procedure. The first message may include a preamble having a cyclic prefix and a set of sequences. The base station 105 may transmit, via the communications manager 102, a second message of the RACH procedure indicating a first TA, and a third message that indicates a second TA. In some cases, the UE 115 device may receive, via the communications manager 101, control signaling from the base station 105 indicating a timing offset for the first message of the RACH procedure. The UE 115 may transmit, via the communications manager 101, the first message using the timing offset in response to receiving the control signaling. The communications managers may further be operable to perform the techniques described herein.

Figure 2A:
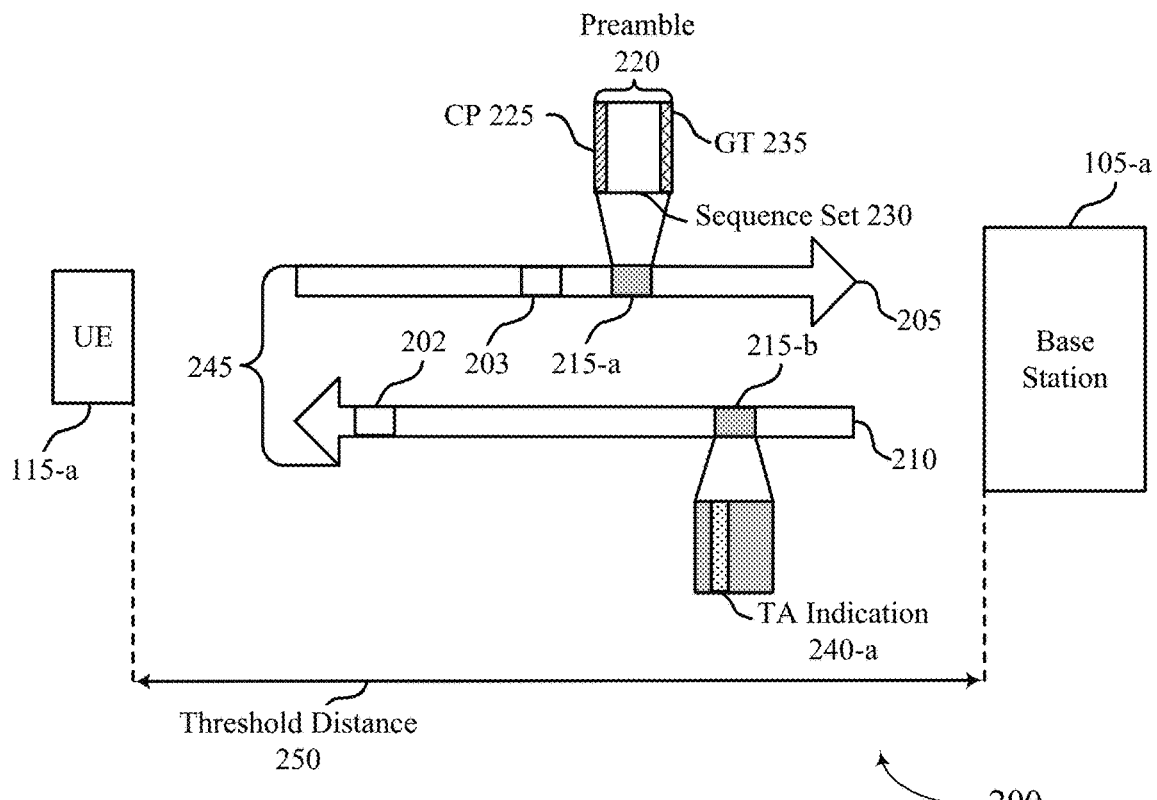
FIGS. 2A and 2B illustrate examples of wireless communications systems that support techniques for large round trip times in random access channel procedures in accordance with one or more aspects of the present disclosure.
Figure 2B:
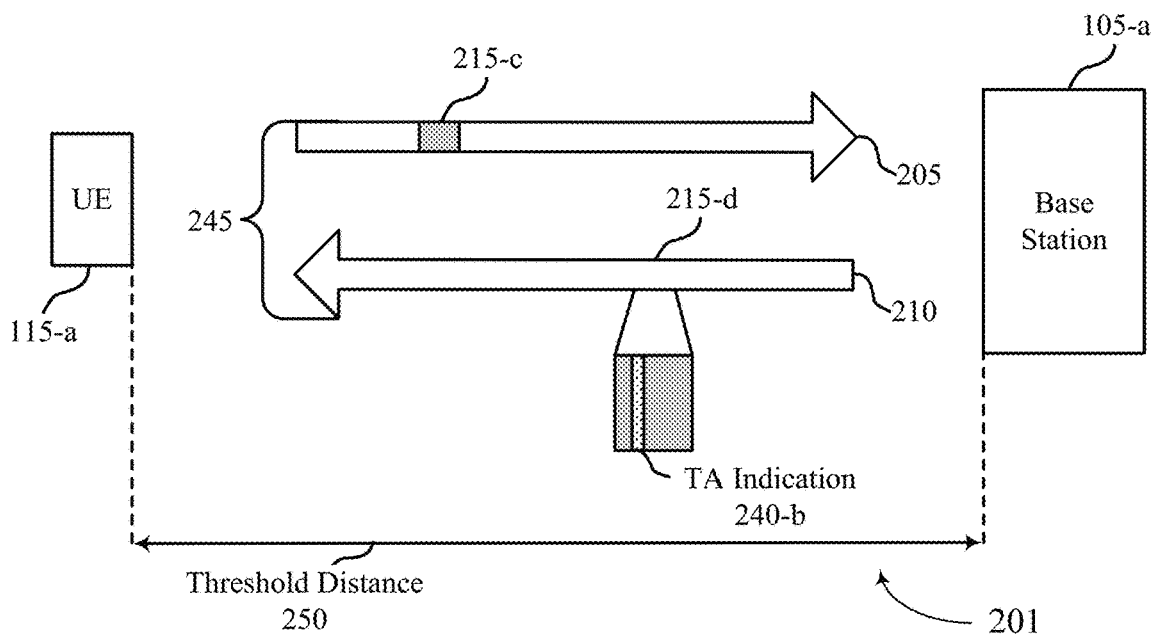

FIGS. 2A and 2B illustrate examples of wireless communications systems 200 and 201 that support techniques for large round trip times in random access channel procedures in accordance with aspects of the present disclosure. For example, the wireless communications systems 200 and 201 may include a base station 105-a and a UE 115-a, which may be examples of a base station 105 and a UE 115 as described herein. Additionally or alternatively, the UE 115-a and the base station 105-a may be examples of IAB nodes, CPEs, or other devices described herein.

In some examples, the base station 105-a and the UE 115-a may perform a multi-step RACH procedure over signals 205 and 210, which may be examples of signals transmitted via communications links as described with reference to FIG. 1. The base station 105-a may transmit control signaling 202 to the UE 115-a. In some cases, the control signaling 202 may indicate that a timing offset 203 for a random access message (e.g., msg 1) is enabled. For example, the control signaling 202 may indicate that a timing offset 203 for a first message 215-a is enabled, and the UE 115-a may transmit the first message 215-a to the base station 105-a after the timing offset 203 occurs in signal 205. In some examples, such a timing offset 203 may be based on location information as described herein. For example, the UE 115-a may identify the timing offset 203 that account for a round trip time based on location information at the UE 115-a indicating a distance between the UE 115-a and the base station 105-a that results in the round trip time. In some cases, the UE 115-a may initiate the multi-step RACH procedure by transmitting a first message 215-a to the base station 105-a. In some cases, the first message 215-a may be a RACH msg 1. In some examples, the first message 215-a may include a random access preamble 220. Furthermore, the preamble 220 may include a cyclic prefix (CP) 225, a sequence set 230, a guard time (GT) 235, or any combination thereof, among other examples of parameters and data.

The base station 105-a may respond to the first message 215-a by transmitting a second message 215-b to the UE 115-a. In some cases, the second message 215 may be a RACH msg 2. The base station 105-a may determine a TA based on the preamble 220 and may include a first TA indication 240-a in the second message 215-b. The UE 115-a may attempt to respond to the second message 215-b by transmitting a message 215-c. In some cases, the message 215-c may be a response to the second message 215-b. For example, the message 215-c may be a RACH msg 3.

In some examples, the base station 105-a may attempt to receive and decode the second message 215-c. The base station 105-a may transmit a message 215-d based on whether the base station 105-a successfully receives and decodes the message 215-c or fails to receive and decode the message 215-c. In some examples, the message 215-d may be a retransmission of message 215-b (e.g., RACH msg 2) with a second TA indication 240-b. In some examples, the message 215-d may be a grant indicating resources for a retransmission of message 215-c by the UE 115-a with the second TA indication 240-b. In some examples, the message 215-d may be a last message of a RACH procedure (e.g., RACH msg 4) with the second TA indication 240-b. The message 215-d may include a second TA indication 240-b that is different than the first TA indication 240-a of message 215-b.

In some examples, the second TA indication 240-b may be an adjustment to the first TA indication 240-a. In such examples, the UE 115-a may communicate signals using the TA indicated by the first TA indication 240-a plus the TA adjustment indicated by the second TA indication 240-b. Additionally or alternatively, the second TA indication 240-b may be an updated TA value and the UE 115-a may communicate the signals using the updated TA value.

As an illustrative example, the first TA may be value for correcting a difference between an expected timing (e.g., a start of a first symbol or other duration of resources for communications) and an actual timing (e.g., a difference between the actual timing may be due to a time for signals to propagate the distance between the devices, which may be referred to as a RTT, among other examples of factors the TA may take into account). However, in some examples, the first TA may be incorrect (e.g., the difference in timing may extend across a boundary of one or more sequences). Accordingly, the second TA indication 240-b may indicate a value (or an adjustment) of a TA+N duration (e.g., N may be a quantity of symbols or other durations, for example, that each correspond to a respective sequence). For example, each TA indication 240 may include be an estimated TA+N*symbol duration with different N values. That is, the devices may attempt to indicate multiple TA indications 240, decode using the multiple TA indications 240, and the like, multiple times, where each TA indication 240 includes a TA plus a different quantity of symbols or other time durations (e.g., 0 symbols, 1 symbol, 2 symbols, 3 symbols, and the like).

In some examples, the communications shown in the wireless communications system 200 may support dedicated resources 245. For example, the base station 105-a may configure (e.g., via control signaling) dedicated RACH occasions (ROs) that support relatively large coverage distances. As an example, a UE 115-a may use location information or otherwise be configured to use the dedicated resources 245 to communicate RACH signaling (e.g., the UE 115-a may be a CPE device or other device a threshold distance from the base station 105-a). In such examples, the base station may perform the techniques described herein (e.g., indicate or decode using multiple TAs) for communications via the dedicated resources 245 and refrain from implementing some techniques for communications via other resources, which may reduce a processing complexity at the base station 105-a.

Figure 3:
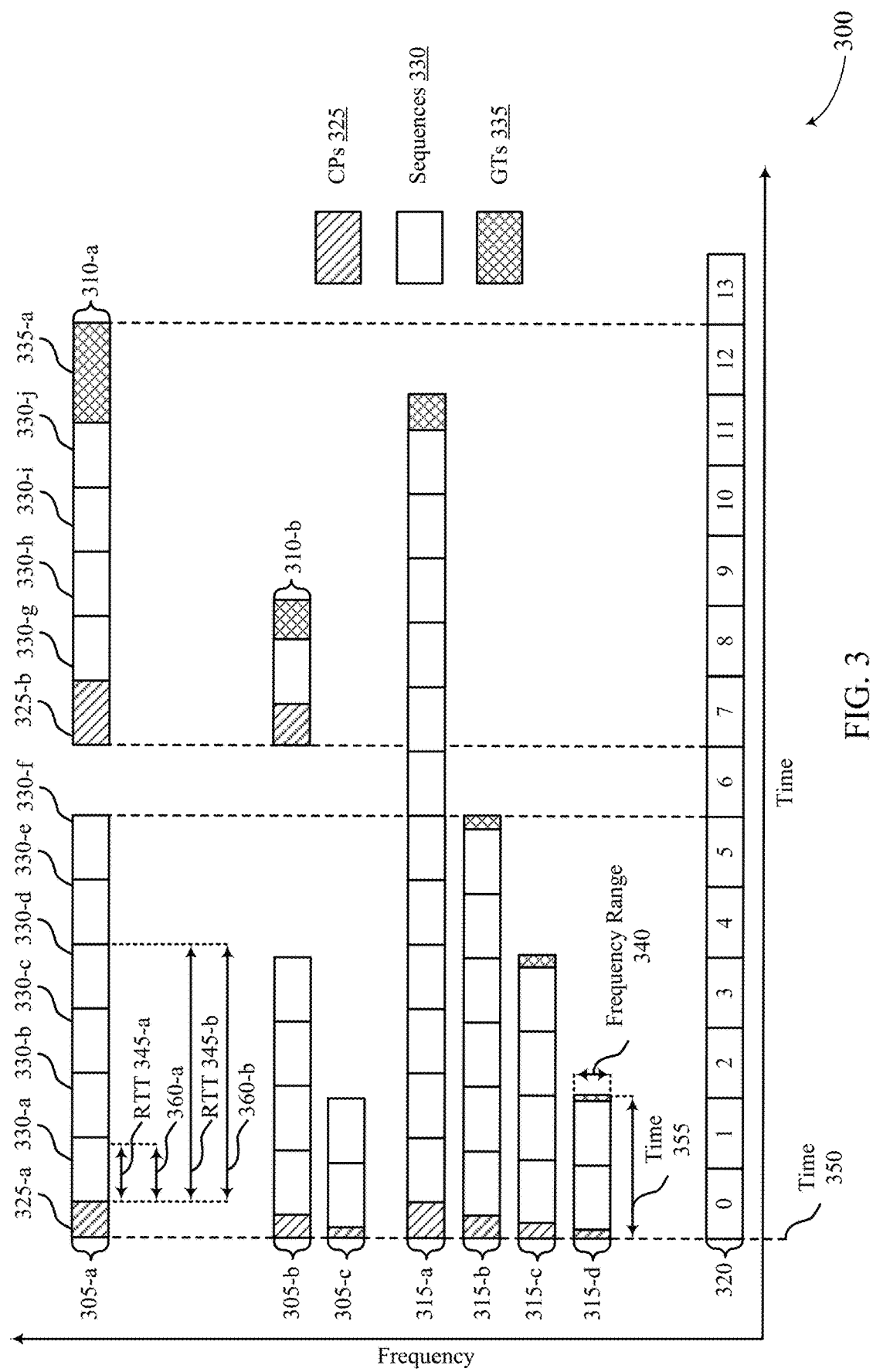
FIG. 3 illustrates examples of preamble configurations that support techniques for large round trip times in random access channel procedures in accordance with one or more aspects of the present disclosure.

FIG. 3 illustrates an example of a preamble configuration 300 that supports techniques for large round trip times in random access channel procedures in accordance with aspects of the present disclosure. The preamble configuration 300 may implement aspects of the wireless communications system 100, the wireless communications system 200, and the wireless communications system 201 as described with reference to FIGS. 1 through 2B.

The preamble configuration 300 may illustrate various short preamble formats. A short preamble format may be an example of a preamble format with a relatively short sequence length compared to long preamble formats (e.g., preamble formats having a duration of 1 ms or less, though any duration may be used). For example, preamble formats 305 (e.g., 305-a, 305-b, 305-c) may be examples of short preamble formats A, preamble formats 310 (e.g., 310-a, 310-b) may be examples of short preamble formats B, and preamble formats 315 (e.g., 315-a, 315-b, 315-c, and 315-d) may be examples of short preamble formats C. Any of preamble formats 305, 310, or 315 may include a CP 325, one or more sequences 330, a GT 335, or any combination thereof. In some cases, the one or more sequences 330 may be an example of a sequence set 230 with reference to FIG. 2. Each preamble format may be aligned with OFDM symbol boundaries. For example, preamble formats 305-a, 310-a, and 315-b may each account for six of the thirteen OFDM symbols 320 (e.g., 0, 1, 2, 3, 4, 5), though any quantity of symbols, type of time durations, preamble formats or sequences, and the like may be used.

In some examples, preamble formats 305, 310, and 315 may be examples of short sequence formats (e.g., the one or more sequences 330 may have a sequence length of L=139, which may be an example of a quantity of data, such as bits, in a Zaddoff Chu sequence). Each preamble format may include one or more OFDM symbols (e.g., 1, 2, 4, 6, or 12) in combination with a CP aggregated at the beginning of a burst (e.g., a beginning of a transmission of the preamble format, such as the start of the CP 325 for a preamble) and may or may not include a GT at the end. As an illustrative example, preamble format 305-a may include a CP 325-a at the beginning of the burst (e.g., the burst of data for the preamble format 305-a may start at time 350), followed by six sequences 330-a, 330-b, 330-c, 330-d, 330-e, and 330-f, and no GT 335. As another illustrative example, preamble format 310-a may include a CP 325-b at the beginning of the burst (e.g., the burst of data for the preamble format 310-a may start at time 350), four sequences 330-g, 330-h, 330-I, and 330-j, and a GT 335-a.

The preamble formats may be scaled based on sub-carrier spacing (e.g., 30 kHz, 60 kHz, or 120 kHz). For example, time may be scaled to $T_s=1/(2*30720)$ ms for 30 kHz subcarrier spacing, $T_s=1/(4*30720)$ ms for 60 kHz subcarrier spacing, and $T_s=1/(8*30720)$ ms for 120 kHz subcarrier spacing. In some examples, one or more of preamble formats 305, 310, and 315 may not be applied to all subcarrier spacings. For example, preamble formats 315-a and 315-b may be supported in combination with certain preamble formats 305 (e.g., 305-a and 315-a, 305-b and 315-b, and 305-c and 315-c). Each preamble format may have dedicated frequency and time resources for transmission, which may be examples of dedicated resources 245 with reference to FIG. 2. For example, preamble format 315-d may be use frequency range 340 and span for time 355. In some cases, each preamble format 305, 315, and 310 may have unique dedicated resources. Each preamble format may be aligned with OFDM symbol boundaries for data with same numerology. When a preamble is transmitted across some boundaries, the CP time may be adjusted. For example, if a preamble is transmitted across a 0.5 millisecond boundary or from a 0.5 millisecond boundary, an additional 16 $T_s$ may be included in the CP time for each additional 0.5 milliseconds. For preamble formats 305, the GT may be defined within the last RACH preamble among consecutively transmitted RACH preambles. Stated alternatively, if multiple RACH preambles of a format 305 are transmitted consecutively (not shown for illustrative clarity), a GT 335 may be included in the last RACH preamble of the consecutively transmitted RACH preambles.

Some wireless communications systems may support short preamble sequences (e.g., mmW systems). However, in some examples, a RTT 345 may be smaller than a symbol duration for a base station (or other device) to determine a TA based on reception of a RACH preamble (e.g., with 120 KHz subcarrier spacing (SCS) physical RACH (PRACH), one symbol duration may be 8.33 microseconds). For example, RTT 345-a spans for less than the length of one sequence (e.g., sequence 330-a). As a merely illustrative example, a coverage may be relatively large which may result in a RTT 345 for communications that exceeds one or more symbols 320 (e.g., with a 5 kilometer (km) distance between devices, a RTT 345 may be 33.33 microseconds, or around 4 symbol durations with 120 KHz SCS). For example, RTT 345-b spans for the length of four sequences 330 (e.g., sequences 330-a, 330-b, 330-c, and 330-d). In other words, a delay (e.g., a RTT 345) between the communications due to a distance between the devices may span past a boundary of a sequence 330 into one or more later sequences 330 of the preamble, allowing the TA to be misinterpreted by the base station. However, a TA command for a random access response (RAR), such as msg 2 of a RACH procedure, may be able to indicate a TA that accounts for such a large RTT 345 (e.g., the TA command for RAR may be 12 bits and a TA granularity using the bits, for example, with 120 KHz SCS, may cover 267 microsecond RTT timing adjustment parameters). Stated alternatively, it may be relatively difficult to support RTTs 345 larger than a RACH symbol duration (e.g., RTT 345-b). For example, a device may be unaware if a timing delay (e.g., a RTT 345) between communications results in receiving signals within a first sequence 330 of a preamble (e.g., 330-a and 330-g), a second sequence 330 of the preamble (e.g., 330-b and 330-h), a third sequence 330 of the preamble (e.g., 330-c and 330-i), and so on. Thus, the TA may incorrectly attempt to adjust a timing from within a first sequence 330 to the end of the first sequence 330, when another TA may correctly adjust the timing from within a different sequence 330.

In accordance with the techniques described herein, devices may account for a relatively large RTT 345 using the various signaling and methods described herein. For example, a device may attempt to receive a preamble using different TAs (e.g., a TA corresponding to each sequence 330) and select the TA to indicate based on the selected TA corresponding to an energy metric that satisfies a threshold. Additionally or alternatively, the device may transmit a third message one or more times (e.g., retransmit a second message of a RACH procedure, transmit a grant for a retransmission of a third message of the RACH procedure, transmit a fourth message of the RACH procedure, and the like), and each instance of the third message may indicate a different TA corresponding to a different sequence until reception of a response is successful. In some examples, the device may transmit control signaling enabling the device transmitting the preambles to send the preambles with a timing offset based on location information.

As an illustrative example, a first TA indication (e.g., a TA indication 240-*a* as described with reference to FIG. 2) may indicate a first TA that accounts for a first RTT 345-*a*. That is, the first TA may correspond to the first sequence 330-*a* of the preamble format 305-*a*. Additionally or alternatively, a second TA indication (e.g., a TA indication 240-*b* as described with reference to FIG. 2) may indicate a second TA that accounts for a larger RTT 345-*b*. In some cases, an indicated TA may result in a symbol duration adjustment 360 that accounts for the timing delay of RTT 345 (e.g., in addition or alternative to other timing delays). As an illustrative example, a TA that accounts for the RTT 345-*a* may indicate or result in a symbol duration adjustment 360-*a* at the receiver device. As another illustrative example, a TA that accounts for a relatively large RTT 345-*b* may indicate or result in a symbol duration adjustment 360-*b*.

In some examples, the wireless communications system may support disaggregated devices and techniques as described herein with reference to FIG. 1. For example, the wireless devices (e.g., the receiver device, the transmitter device, or both) may include or be examples of a disaggregated UE. In such examples, the techniques described herein may be applied to one or more panels of the disaggregated UE. For example, a disaggregated UE may have multiple panels which may not be collocated. The multiple panels may thus experience different timing delays and use different TAs for the respective panels (e.g., each panel may use a different timing adjustment). For instance, a first panel of the disaggregated UE may communicate signals having the RTT 345-*a* that is smaller than a symbol duration. The first panel may use a respective TA that accounts for the RTT 345-*a*. A second panel of the disaggregated UE may communicate signals having a RTT 345 that exceeds one or more symbols 320. The second panel may implement one or more techniques described herein to account for the RTT 345 larger than the one or more symbols 320. That is, the second panel may use a second TA different than the TA of the first panel (e.g., the techniques described herein may be applied to each of the panels, some of the panels, or none of the panels of the disaggregated UE).

Figure 4:
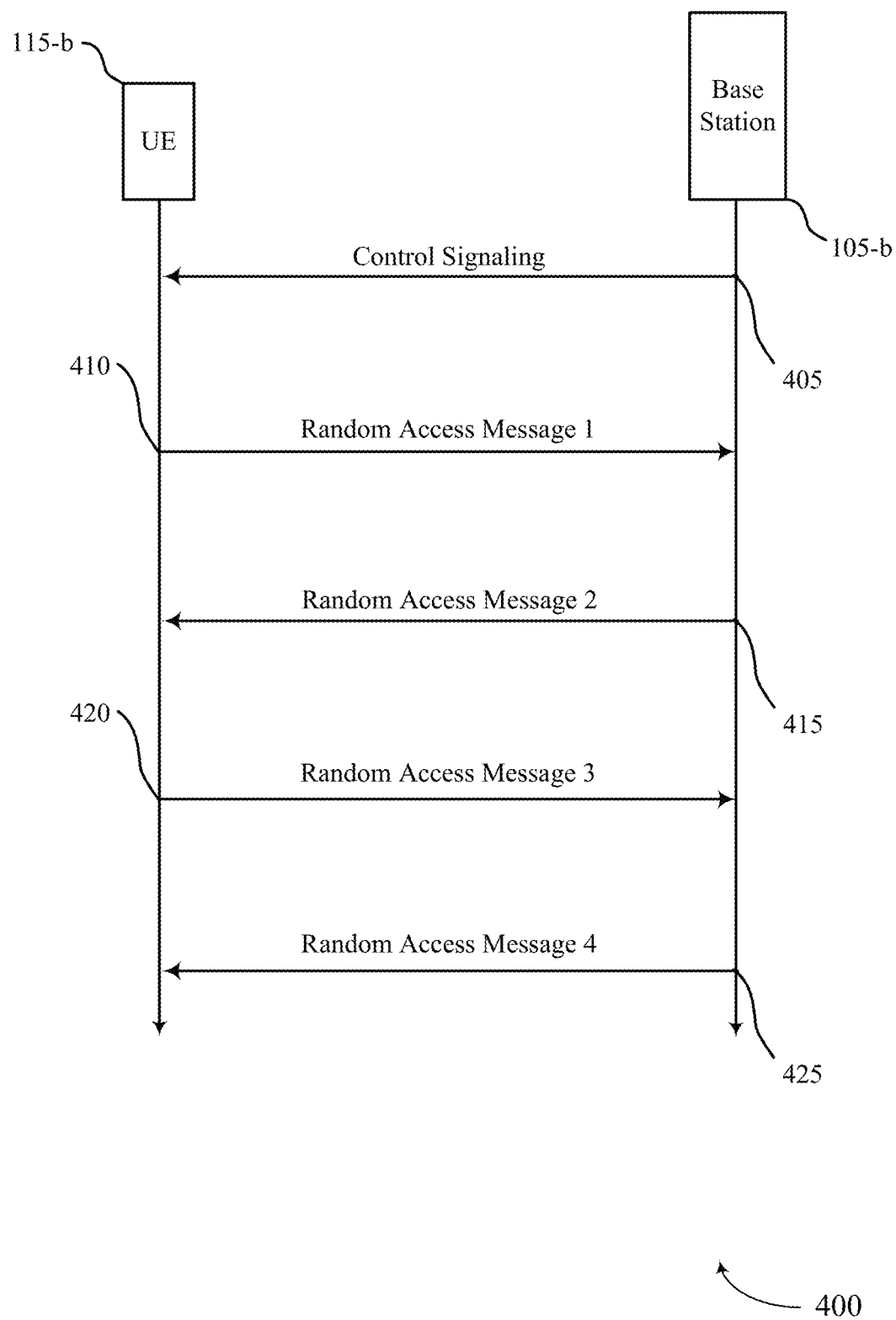
FIG. 4 illustrates an example of a process flow that supports techniques for random access channel procedures in accordance with one or more aspects of the present disclosure.

FIG. 4 illustrates an example of a process flow 400 that supports techniques for large round trip times in random access channel procedures in accordance with aspects of the present disclosure. The process flow 400 may implement aspects of the wireless communications system 100 and the wireless communications system 200 described with reference to FIGS. 1 and 2, respectively.

In the following description of the process flow 400, the operations between the base station 105-*b* and the UE 115-*b* may be transmitted in a different order than the example order shown, or the operations performed by the base station 105-*b* and the UE 115-*b* may be performed in different orders or at different times. Some operations may also be omitted from the process flow 400, and other operations may be added to the process flow 400. The base station 105-*b* and the UE 115-*b* may be examples of a base station 105 and UE 115 as described with reference to FIGS. 1 and 2, respectively.

The UE 115-*b* may establish a communication link with the base station 105-*b* by using a four-step random access procedure. In such cases, the UE 115-*b* may transmit at least two random access messages (e.g., random access message 1 and random access message 3) and base station 105-*b* may transmit at least two random access messages (e.g., random access message 2 and random access message 4).

At 405, the base station 105-*b* may transmit control signaling to the UE 115. The control signaling may include configuration information such as a signal synchronization block (SSB) configuration (e.g., including resource allocation for SSBs, timing information, an indication of beams associated with respective SSBs, or the like), reference signal configuration information, PRACH resource configuration, or the like. In some examples, the base station 105-*b* may transmit the control signaling in system information, radio resource control (RRC) signaling, or the like. In some examples, control signaling 405 may include channel quality threshold information, channel quality threshold measurement difference threshold information, or the like.

At 410, the UE 115-*b* may initiate a random access procedure by transmitting random access message 1 (e.g., RACH msg 1). In some cases, random access message 1 may include a RACH preamble. The RACH preamble may include a cyclic prefix, a set of sequences, a guard time, or a combination thereof. In one example, the RACH preamble may carry a random access radio network temporary identifier (RA-RNTI). As shown, the UE 115-*b* may transmit random access message 1 to the base station 105.

At 415, the base station 105-*b* may transmit random access message 2 (e.g., RACH msg 2). Random access message 2 may include control signaling (e.g., via a physical downlink control channel (PDCCH)) and a physical uplink shared channel (PDSCH) carrying a payload with the contents of the message. Random access message 2 may include a RACH preamble response. The RACH preamble response may include information for the UE 115. For example, the RACH preamble response may include a TA parameter, an uplink grant to the UE 115, a temporary cell radio network temporary identifier (TC-RNTI), a resource block (RB) assignment, a modulation coding scheme (MCS) configuration, and the like. Additionally, the base station 105-*b* may configure itself to receive random access message 3 (e.g., RACH msg 3) using the information included in random access message 2. The UE 115-*b* may receive random access message 2 and may decode random access message 2 (e.g., RACH preamble response) and obtain the information included in random access message 2. The included information may enable the UE 115-*b* to transmit random access message 3 at 420.

At 420, the UE 115-*b* may utilize information received in random access message 2 (e.g., the received TA indication, TC-RNTI and uplink grant) to transmit a corresponding random access message 3 (e.g., on a PUSCH). In some examples, random access message 3 may be a response to random access message 2. Random access message 3 may include a radio RRC connection request. The base station 105-*b* a may receive random access message 3 and decode random access message 3 to generate random access message 4 (e.g., RACH msg 4) using the received information (e.g., the RRC connection request).

At 425, the base station 105-*b* a may transmit random access message 4 that may include an RRC connection setup corresponding to the UE 115-*b* (e.g., the RRC connection setup may be associated with a TC-RNTI of the UE 115-*b* a). Random access message 4 may include control signaling (e.g., on a PDCCH) and data for the random access message (e.g., on a PDSCH). Random access message 4 may also include a cell radio network temporary identifier (CRNTI) for future communication with the UE 115. For instance, after random access message 4, the UE 115-*b* and the base station 105-*b* may communicate using the CRNTI.

In some examples, a UE 115-*b* and a base station 105-*b* may perform a multi-step random access procedure described with reference to FIG. 5. In some examples, while the process flow 400 and the process flow 500 illustrate four-step RACH procedures for illustrative clarity, it is to be understood that any RACH procedure may be used and support the techniques described herein (e.g., some or all the contents of msg1 and msg3 may be combined in a msgA of a two-step RACH procedure, and some or all the contents of msg2 and msg4 may be combined in a msgB of the two-step RACH procedure).

Figure 5:
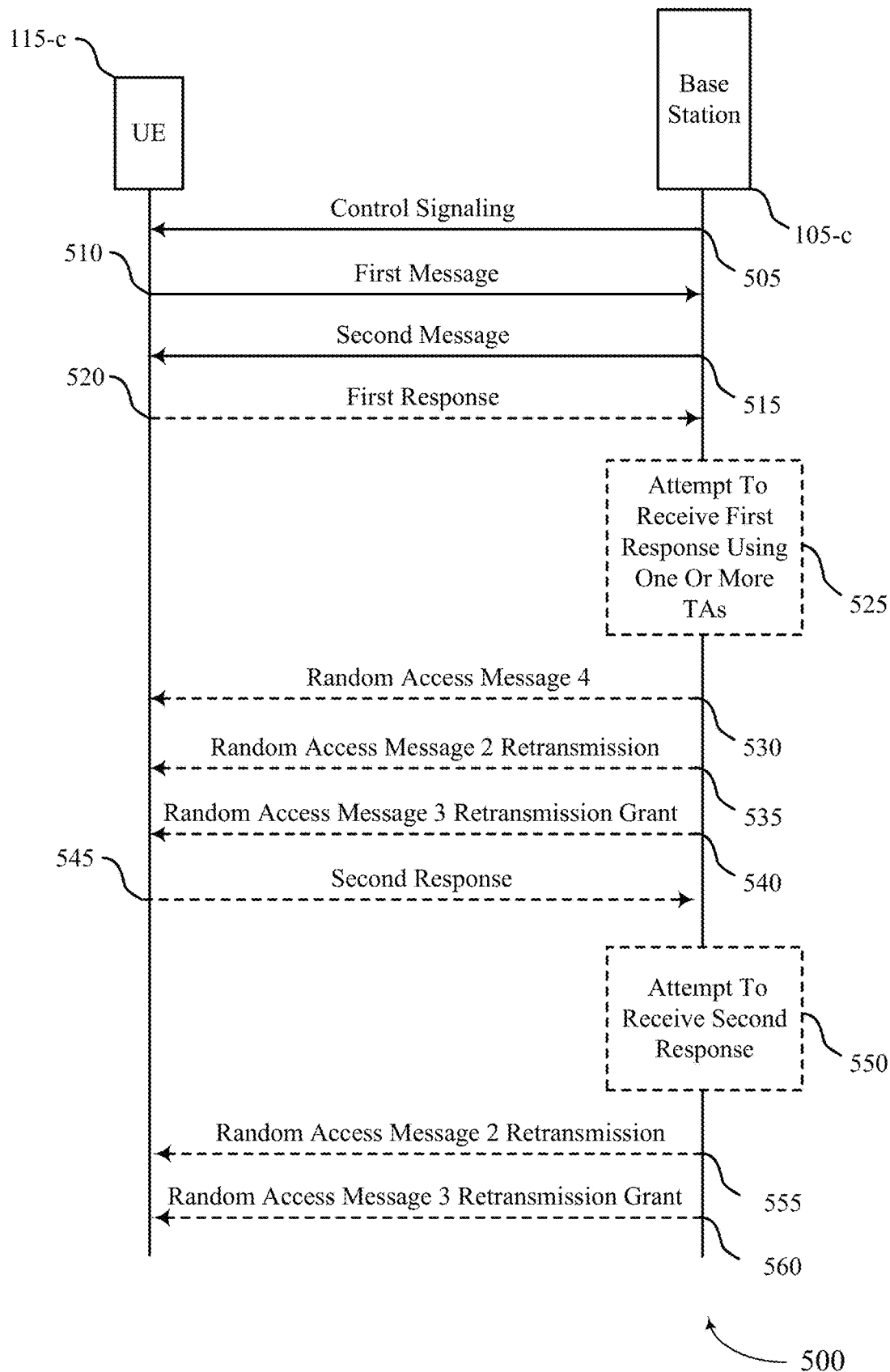
FIG. 5 illustrates an example of a process flow that supports techniques for large round trip times in random access channel procedures in accordance with one or more aspects of the present disclosure.

FIG. 5 illustrates an example of a process flow 500 that supports techniques for large round trip times in random access channel procedures in accordance with aspects of the present disclosure. The process flow 500 may implement aspects of the wireless communications system 100 and the wireless communications system 200 described with reference to FIGS. 1 and 2, respectively. In the description of the process flow 500, the operations between the base station 105-*c* and the UE 115-*c* may be transmitted in a different order than the example order shown, or the operations performed by the base station 105-*c* and the UE 115-*c* may be performed in different orders or at different times. Some operations may also be omitted from the process flow 500, and other operations may be added to the process flow 500. The base station 105-*c* and the UE 115-*c* may be examples of a base station 105 and a UE 115 as described with reference to FIGS. 1, 2, and 4 or may be examples of any other wireless device described herein (e.g., CPE, IAB nodes, and the like).

The UE 115-*c* may establish a communication link between the UE 115-*c* and the base station 105-*c* by a multi-step random access procedure. In such cases, the UE 115-*c* may transmit one or more random access messages (e.g., a first message, a first response, a second response, or a combination thereof) which may include a RACH msg 1, a RACH msg3, or both. The base station 105-*c* may transmit one or more random access messages (e.g., a second message, a random access message 4, one or more random access message 2 retransmissions, one or more random access message 3 retransmission grants, or a combination thereof) which may include a RACH msg 2, a RACH msg 4, or both. In some cases, the UE 115-*c* may have dedicated resources (e.g., ROs) and may support larger coverage distances. The one or more random access messages may be transmitted using the dedicated resources, based at least in part on the distance between the UE 115-*c* and the base station 105. For example, if the base station 105-*c* is a threshold distance from the UE 115-*c*, the UE 115-*c* and base station 105-*c* may use the dedicated ROs.

At 505, the base station 105-*c* may transmit control signaling to the UE 115-*c*. The control signaling may include configuration information such as SSB configuration (e.g., including resource allocation for SSBs, timing information, an indication of beams associated with respective SSBs, or the like), reference signal configuration information, PRACH resource configuration, or the like. In some examples, the base station 105-*c* may transmit the control signaling in system information, radio resource control (RRC) signaling, or the like. In some examples, the control signaling 505 may include channel quality threshold information, channel quality threshold measurement difference threshold information, or the like. The control signaling 505 may be an example of control signaling 405 as described with reference to FIG. 4. In some cases, the control signaling 505 may indicate that a timing offset (also referred to as a TA offset) for a random access message (e.g., msg 1) is enabled. For example, a UE 115-*c* (e.g., a CPE user or an IAB node) may be allowed to transmit a random access message with a non-zero TA offset, based at least in part on its location information when the location information is available. Additionally or alternatively, the UE 115-*c* may use ROs based on having location information for the UE 115-*c*. Put another way, with reference to FIG. 5, the control signaling 505 may indicate that a TA offset for the first random access message is enabled, and the UE 115-*c* may transmit the first random access message, as shown at 510, with the TA offset to the base station 105. In some cases, the TA offset may include a symbol duration adjustment relative to the start of the first random access message or a start of a first sequence of a set of sequences included in the first random access message, based at least in part on location information associated with the UE 115-*c*. In some cases, the control signaling may include remaining minimum system information (RMSI) signaling.

At 510, the UE 115-*c* may initiate a random access procedure by transmitting a first message to the base station 105. In some cases, the first message may be an example of the first message 215-*a*, as described with reference to FIG. 2, the random access message 1 (e.g., RACH msg 1), as described with reference to FIG. 4, or both. In some cases, the first message may include a RACH preamble, and the RACH preamble may include a cyclic prefix, a set of sequences, a guard time, or a combination thereof. Upon receiving the first message, the base station 105-*c* may attempt one or more timing estimates associated with the RTT. In some cases, the RTT symbol duration may be TA+N*, where TA represents a TA of a first sequence (e.g., corresponding to a first symbol) and N represents a quantity of one or more symbols to adjust the TA. The base station 105-*c* may attempt to detect the RACH preamble using multiple hypotheses of N in order to estimate multiple TA parameters. For example, each TA parameter may be associated with an energy metric. The base station 105-*c* may receive the first message using each estimated TA parameter in order to obtain their associated energy metric. In some examples, the base station may select the TA parameter associated with the highest received energy. In some cases, the base station 105-*c* may only attempt multiple hypotheses of N for ROs indicated by the control signaling. In some cases, the base station 105-*c* may estimate one or more TA parameters associated with the RTT without additional symbol level hypotheses. For example, the base station 105-*c* may estimate only a first TA parameter without the comparison of energy metrics. In such cases, the first TA parameter may not be associated with the highest received energy.

At 515, the base station 105-*c* may transmit a second message to the UE 115. In some cases, the second message may be an example of the second message 215-*b*, as described with reference to FIG. 2, the random access message 2 (e.g., RACH msg 2), as described with reference to FIG. 4, or both. Additionally or alternatively, the second message may be a response to the first message. In some cases, the second message may include a first TA parameter. For example, the second message may include an estimated TA parameter, as determined and selected by the base station 105. If the base station 105-*c* estimates only a first TA parameter, the second message may include the first estimated TA parameter.

In some examples, at 520 the UE 115-*c* may transmit a first response. In some cases, the first response may be an example of the third message 215-*c*, as described with reference to FIG. 2, the random access message 3 (e.g., RACH msg 3), as described with reference to FIG. 3, or both. Additionally or alternatively, the first response may be a response to the second message transmitted at 515.

In some examples, at 525 the base station 105-*c* may attempt to receive and decode the first response using one or more TA parameters. In some cases, the base station 105-*c* may successfully receive and decode the first response using one or more TA parameters. In some cases, the base station 105-*c* may fail to detect the first response with the indicated TA parameter and attempt to detect the first response with a different TA parameter. For example, the base station 105-*c* may identify an additional symbol level TA adjustment (also referred to as a timing offset) beyond the TA parameter indicated in the second message. The multiple estimated TA parameters used to detect the first response may be based at least in part on one or more reference signals (e.g., DMRSs). In some cases, the base station 105-*c* may fail to receive the first response using the one or more TA parameters. For example, if the estimated TA parameter indicated in the second message was not an accurate estimation, processing or decoding errors may occur at 510, 515, 520, or some combination thereof.

In some examples, at 530 if the base station 105-*c* successfully receives the first response using one or more TA parameters, the base station 105-*c* may transmit a random access message 4. In some cases, the random access message 4 may be an example of the fourth message 215-*d*, as described with reference to FIG. 2, the random access message 4 (e.g. msg 4), as described with reference to FIG. 3, or both. In some cases, the random access message 4 may include an indication of an additional symbol level TA adjustment identified by the base station 105. For example, the 2-bit downlink assignment index is reserved when a downlink control information (DCI) format 1_0 is addressed to TC-RNTI and may be available for an additional symbol level TA adjustment indication. Additionally or alternatively, the additional symbol level TA adjustment may be included on a PDSCH for the random access message 4. For example, a 6-bit MAC-CE TA command may be reused and included in a msg 4 PDSCH. If the 6-bit range is not sufficient, the 6*K bit TA may be constructed by concatenating a K 6-bit MAC-CE TA command. Additionally or alternatively, a new MAC-CE may be introduced to indicate the symbol level TA adjustment or to increase TA range.

In some examples at 535 if the base station 105-*c* fails to receive the first response using one or more TA parameters, the base station 105-*c* may transmit a random access message 2 retransmission. In some cases, the retransmission may be an example of the fourth message 215-*d*, as described with reference to FIG. 2, a retransmission of random access message 2 (e.g. msg 2), as described with reference to FIG. 3, or both. For example, if the base station 105-*c* does not detect the first response, the base station 105-*c* may issue another second message (e.g., msg 2) with an updated TA parameter as an estimated TA+N*. For any random access message 2 retransmission, the base station 105-*c* may use a different N.

In some examples, at 540 if the base station 105-*c* fails to receive the first response using one or more TA parameters, the base station 105-*c* may transmit a random access message 3 retransmission grant. In some cases, the retransmission grant may be an example of the fourth message 215-*d*, as described with reference to FIG. 2. For example, if the base station 105-*c* does not detect the first response, the base station 105-*c* may issue a grant for the retransmission of the first response (e.g., a retransmission of msg 3). In some cases, the grant may indicate an additional symbol level TA adjustment for the retransmission. For example, the 1-bit new data indicator (NDI) and the 4-bit HARQ process number are each reserved when the DCI format 0_0 is addressed to TC-RNTI and may be repurposed for the symbol level TA adjustment indication. When receiving the random access message 3 retransmission grant, the UE 115-*c* may be allowed to apply the additional symbol level timing offset.

In some examples, at 545 the UE 115-*c* may transmit a second response. In some cases, the second response may be an example of a random access message 3 (e.g., RACH msg 3), as described with reference to FIG. 3. For example, in some cases, the second response may be a random access message 3 in response to the random access message 2 retransmitted at 535. Alternatively, the second response may be a retransmission of the first response (e.g., RACH msg 3), in response to the random access message 3 retransmission grant transmitted at 540. For each retransmission of random access message 3, the UE 115-*c* may use a different symbol level timing offset. In both cases, the second response may be based at least in part on a symbol level TA adjustment indicated by the base station 105.

In some examples, at 550 the base station 105-*c* may replicate steps similar to those performed at 525. For example, the base station 105-*c* may attempt to receive and decode the second response using one or more TA parameters. In some cases, the base station 105-*c* may successfully receive and decode the first response using the or more TA parameters. In some cases, the base station 105-*c* may fail to receive the first response using the one or more TA parameters. For example, if the estimated TA parameter indicated in the random access message 2 retransmission or in the random access message 3 retransmission grant was not an accurate estimation, processing or decoding errors may occur.

In some examples, at 555 if the base station 105-*c* fails to receive the second response using the one or more TA parameters, the base station 105-*c* may transmit another random access message 2 retransmission. For example, if the base station 105-*c* does not detect the first response or the second response, the base station 105-*c* may issue yet another second message (e.g., msg 2) with an updated TA parameter as an estimated TA+N*, where N may be different from any previous values of N.

In some examples, at 560 if the base station 105-*c* fails to receive the second response using the one or more TA parameters, the base station 105-*c* may transmit another random access message 3 retransmission grant. For example, if the base station 105-*c* does not detect the first or second response, the base station 105-*c* may issue yet another grant for the retransmission of the first response (e.g., another retransmission of msg 3). In some cases, the grant may indicate a new additional symbol level TA adjustment for the retransmission.

In some cases, the operations performed by the base station 105-*c* and the UE 115-*c* may be performed multiple times. For example, operations similar to those described at 525, 530, and 535 and similarly at 550, 555, and 560, may repeat based at least in part on the success of following transmissions and receptions. For example, if the base station 105-*c* continues to fail to receive a random access message 3, such as the first response, second response, and any other responses that may occur after 560, the base station 105-*c* may continue to retransmit the random access message 2 or random access message 3 retransmission grants using different symbol level TA adjustments.

Figure 6:
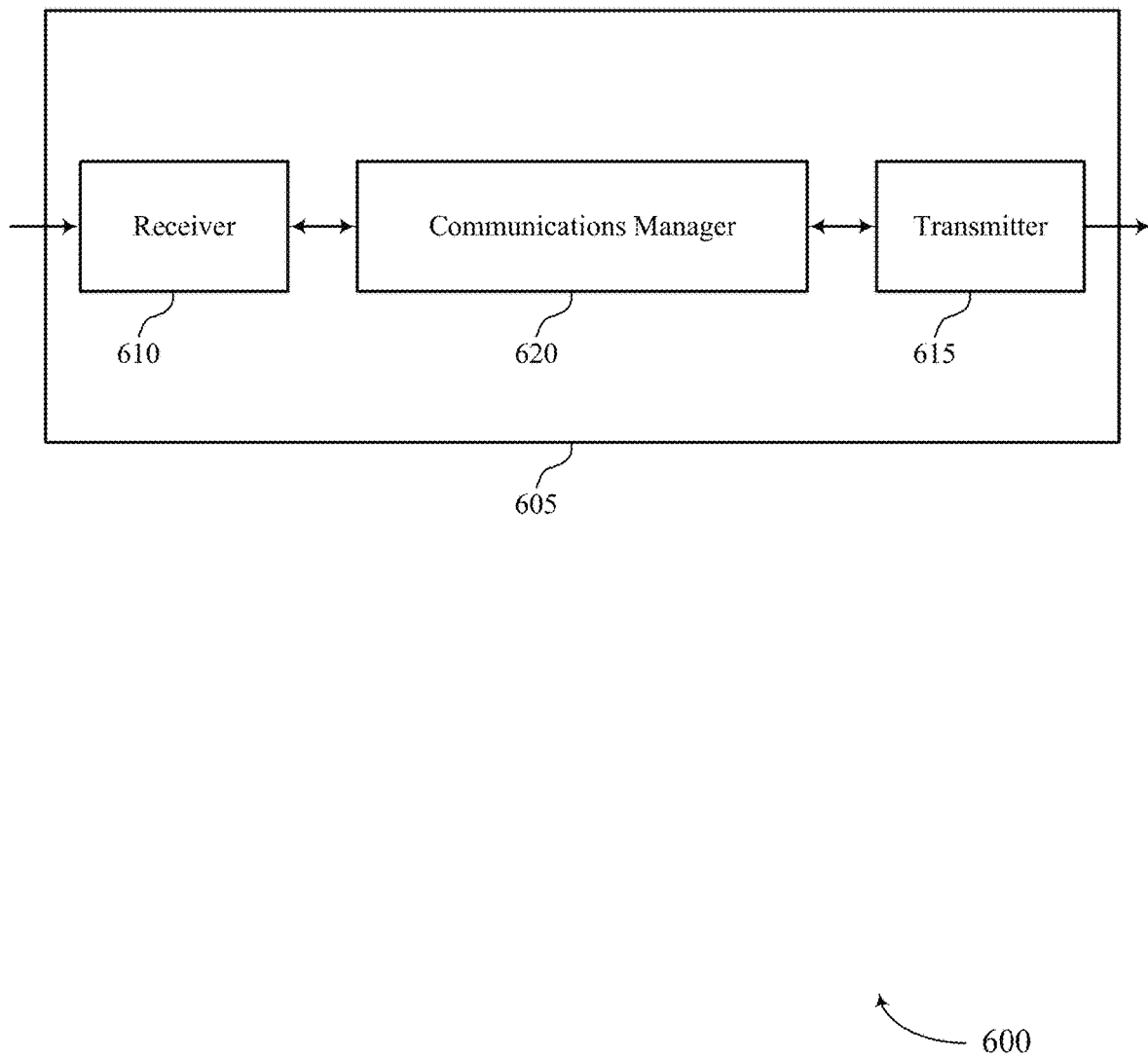
FIGS. 6 and 7 show block diagrams of devices that support techniques for large round trip times in random access channel procedures in accordance with one or more aspects of the present disclosure.

FIG. 6 shows a block diagram 600 of a device 605 that supports techniques for large round trip times in random access channel procedures in accordance with aspects of the present disclosure. The device 605 may be an example of aspects of a base station 105 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for large round trip times in random access channel procedures). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for large round trip times in random access channel procedures). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for large round trip times in random access channel procedures as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a DSP, an ASIC, a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communications at a first wireless device in accordance with examples as disclosed herein. For example, the communications manager 620 may be configured as or otherwise support a means for receiving a first message of a random access channel procedure from a second wireless device, the first message including a preamble having a cyclic prefix and a set of sequences. The communications manager 620 may be configured as or otherwise support a means for transmitting a second message of the random access channel procedure to the second wireless device, the second message indicating a first timing parameter for communications between the first wireless device and the second wireless device, the first timing parameter based on the preamble of the first message. The communications manager 620 may be configured as or otherwise support a means for transmitting a third message to the second wireless device indicating a second timing parameter.

Additionally or alternatively, the communications manager 620 may support wireless communications at a first wireless device in accordance with examples as disclosed herein. For example, the communications manager 620 may be configured as or otherwise support a means for receiving a first message of a random access channel procedure from a second wireless device, the first message including a preamble having a cyclic prefix and a set of sequences. The communications manager 620 may be configured as or otherwise support a means for transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

By including or configuring the communications manager 620 in accordance with examples as described herein, the device 605 (e.g., a processor controlling or otherwise coupled to the receiver 610, the transmitter 615, the communications manager 620, or a combination thereof) may support more efficient utilization of communication resources.

Figure 7:
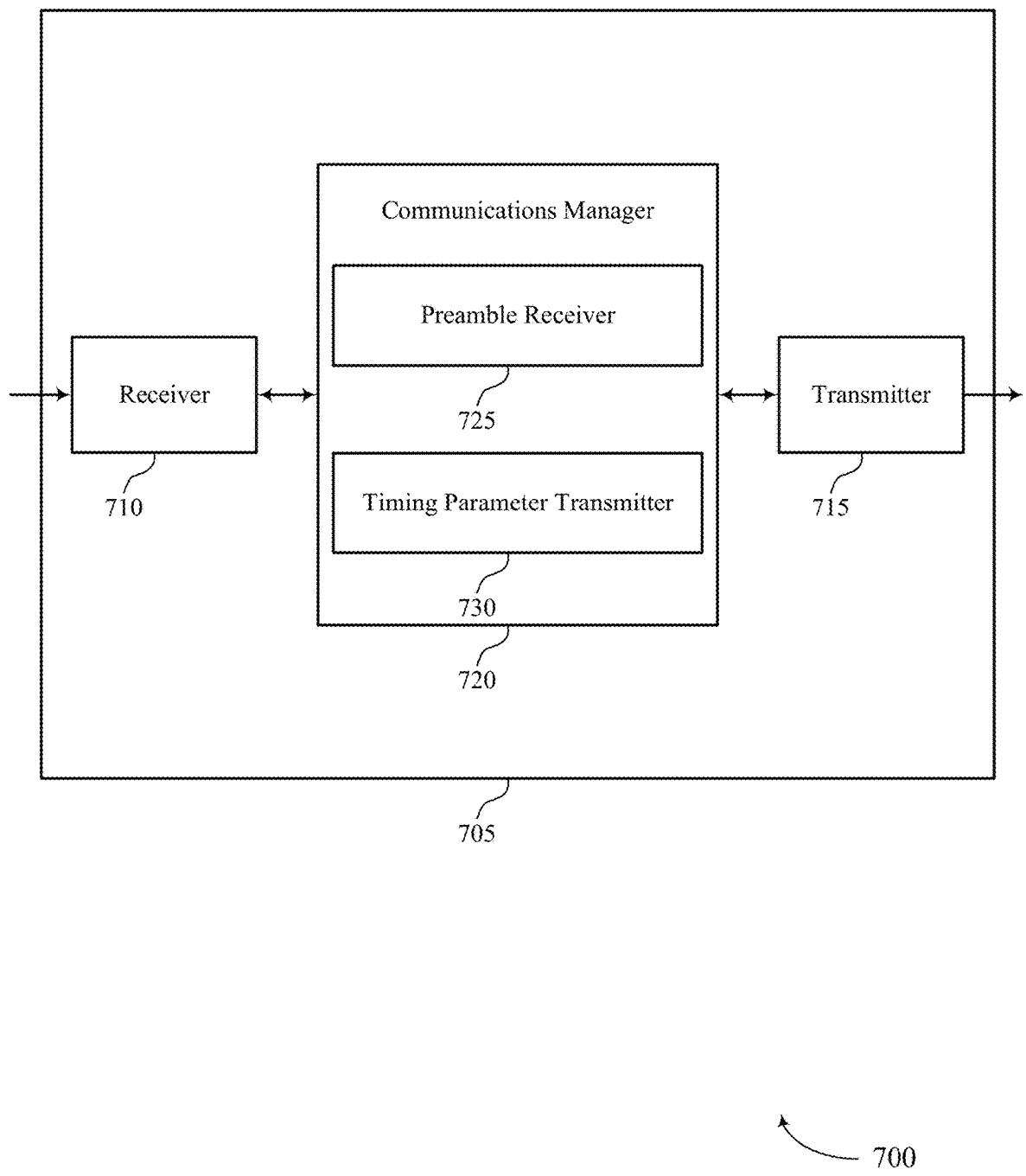

FIG. 7 shows a block diagram 700 of a device 705 that supports techniques for large round trip times in random access channel procedures in accordance with aspects of the present disclosure. The device 705 may be an example of aspects of a device 605 or a base station 105 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for large round trip times in random access channel procedures). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for large round trip times in random access channel procedures). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for large round trip times in random access channel procedures as described herein. For example, the communications manager 720 may include a Preamble Receiver 725 a Timing Parameter Transmitter 730, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at a first wireless device in accordance with examples as disclosed herein. The Preamble Receiver 725 may be configured as or otherwise support a means for receiving a first message of a random access channel procedure from a second wireless device, the first message including a preamble having a cyclic prefix and a set of sequences. The Timing Parameter Transmitter 730 may be configured as or otherwise support a means for transmitting a second message of the random access channel procedure to the second wireless device, the second message indicating a first timing parameter for communications between the first wireless device and the second wireless device, the first timing parameter based on the preamble of the first message. The Timing Parameter Transmitter 730 may be configured as or otherwise support a means for transmitting a third message to the second wireless device indicating a second timing parameter.

Additionally or alternatively, the communications manager 720 may support wireless communications at a first wireless device in accordance with examples as disclosed herein. The Preamble Receiver 725 may be configured as or otherwise support a means for receiving a first message of a random access channel procedure from a second wireless device, the first message including a preamble having a cyclic prefix and a set of sequences. The Timing Parameter Transmitter 730 may be configured as or otherwise support a means for transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

Figure 8:
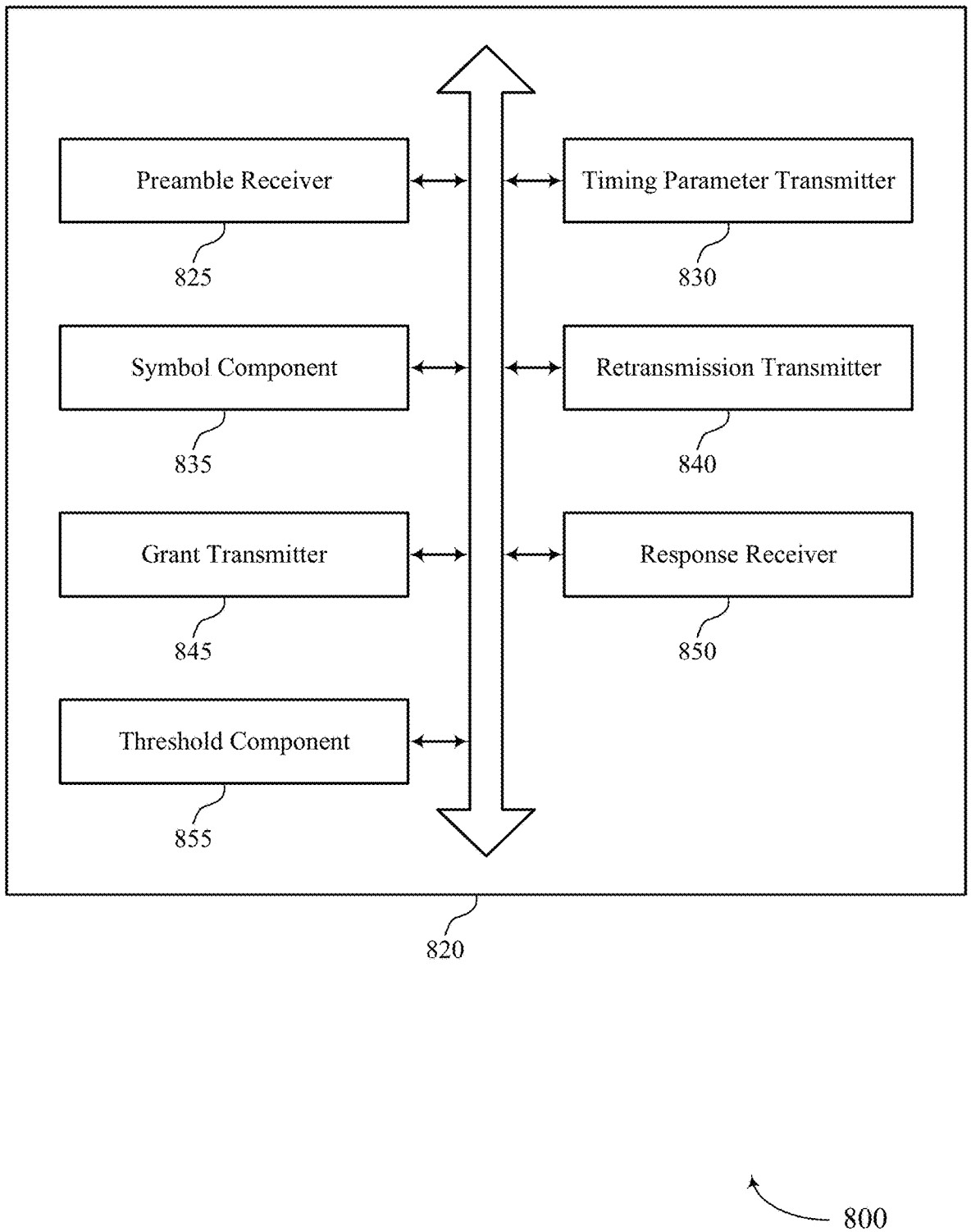
FIG. 8 shows a block diagram of a communications manager that supports techniques for large round trip times in random access channel procedures in accordance with one or more aspects of the present disclosure.

FIG. 8 shows a block diagram 800 of a communications manager 820 that supports techniques for large round trip times in random access channel procedures in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for large round trip times in random access channel procedures as described herein. For example, the communications manager 820 may include a preamble receiver 825, a timing parameter transmitter 830, a symbol component 835, a retransmission transmitter 840, a grant transmitter 845, a response receiver 850, a threshold component 855, or any combination thereof. Each of these components may communicate, directly or indirectly, with one another (e.g., via one or more buses).

The communications manager 820 may support wireless communications at a first wireless device in accordance with examples as disclosed herein. the preamble receiver 825 may be configured as or otherwise support a means for receiving a first message of a random access channel procedure from a second wireless device, the first message including a preamble having a cyclic prefix and a set of sequences. The timing parameter transmitter 830 may be configured as or otherwise support a means for transmitting a second message of the random access channel procedure to the second wireless device, the second message indicating a first timing parameter for communications between the first wireless device and the second wireless device, the first timing parameter based on the preamble of the first message. In some examples, the timing parameter transmitter 830 may be configured as or otherwise support a means for transmitting a third message to the second wireless device indicating a second timing parameter.

In some examples, the first timing parameter corresponds to a first symbol associated with a first sequence of the set of sequences and the second timing parameter corresponds to a second symbol associated with a second sequence of the set of sequences.

In some examples, to support transmitting the third message, the retransmission transmitter 840 may be configured as or otherwise support a means for retransmitting the second message of the random access channel procedure indicating the second timing parameter based on failing to receive a response to the second message.

In some examples, the retransmission transmitter 840 may be configured as or otherwise support a means for retransmitting the second message of the random access channel procedure indicating a third timing parameter based on failing to receive a response to the third message.

In some examples, to support transmitting the third message, the grant transmitter 845 may be configured as or otherwise support a means for transmitting, to the second wireless device, a grant for a retransmission of the response to the second message based on failing to receive the response to the second message, the grant indicating the second timing parameter.

In some examples, the grant transmitter 845 may be configured as or otherwise support a means for transmitting a second grant for a second retransmission of the response to the second message based on failing to receive the response to the third message, the second grant indicating a third timing parameter.

In some examples, the response receiver 850 may be configured as or otherwise support a means for receiving the response to the second message using the second timing parameter, where transmitting the third message indicating the second timing parameter is based on receiving the response to the second message using the second timing parameter.

In some examples, the third message includes a last message of the random access channel procedure.

In some examples, to support receiving the response to the second message, the response receiver 850 may be configured as or otherwise support a means for attempting to receive the response using the first timing parameter. In some examples, to support receiving the response to the second message, the response receiver 850 may be configured as or otherwise support a means for receiving the response using the second timing parameter based on failing to receive the response using the first timing parameter.

In some examples, receiving the response using the second timing parameter is based on one or more reference signals of the response.

In some examples, the threshold component 855 may be configured as or otherwise support a means for communicating one or more messages of the random access channel procedure via dedicated resources based on the second wireless device being a threshold distance from the first wireless device.

Additionally or alternatively, the communications manager 820 may support wireless communications at a first wireless device in accordance with examples as disclosed herein. in some examples, the preamble receiver 825 may be configured as or otherwise support a means for receiving a first message of a random access channel procedure from a second wireless device, the first message including a preamble having a cyclic prefix and a set of sequences. In some examples, the timing parameter transmitter 830 may be configured as or otherwise support a means for transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

In some examples, the first symbol duration adjustment corresponds to a first sequence of the set of sequences and the second symbol duration adjustment correspond to a second sequence of the set of sequences.

In some examples, the preamble receiver 825 may be configured as or otherwise support a means for receiving the first message using the first timing parameter having the first symbol duration adjustment to obtain the first energy metric. In some examples, the preamble receiver 825 may be configured as or otherwise support a means for receiving the first message using the second timing parameter having the second symbol duration adjustment to obtain the second energy metric.

In some examples, the threshold component 855 may be configured as or otherwise support a means for communicating one or more messages of the random access channel procedure via dedicated resources based on the second wireless device being a threshold distance from the first wireless device.

Figure 9:
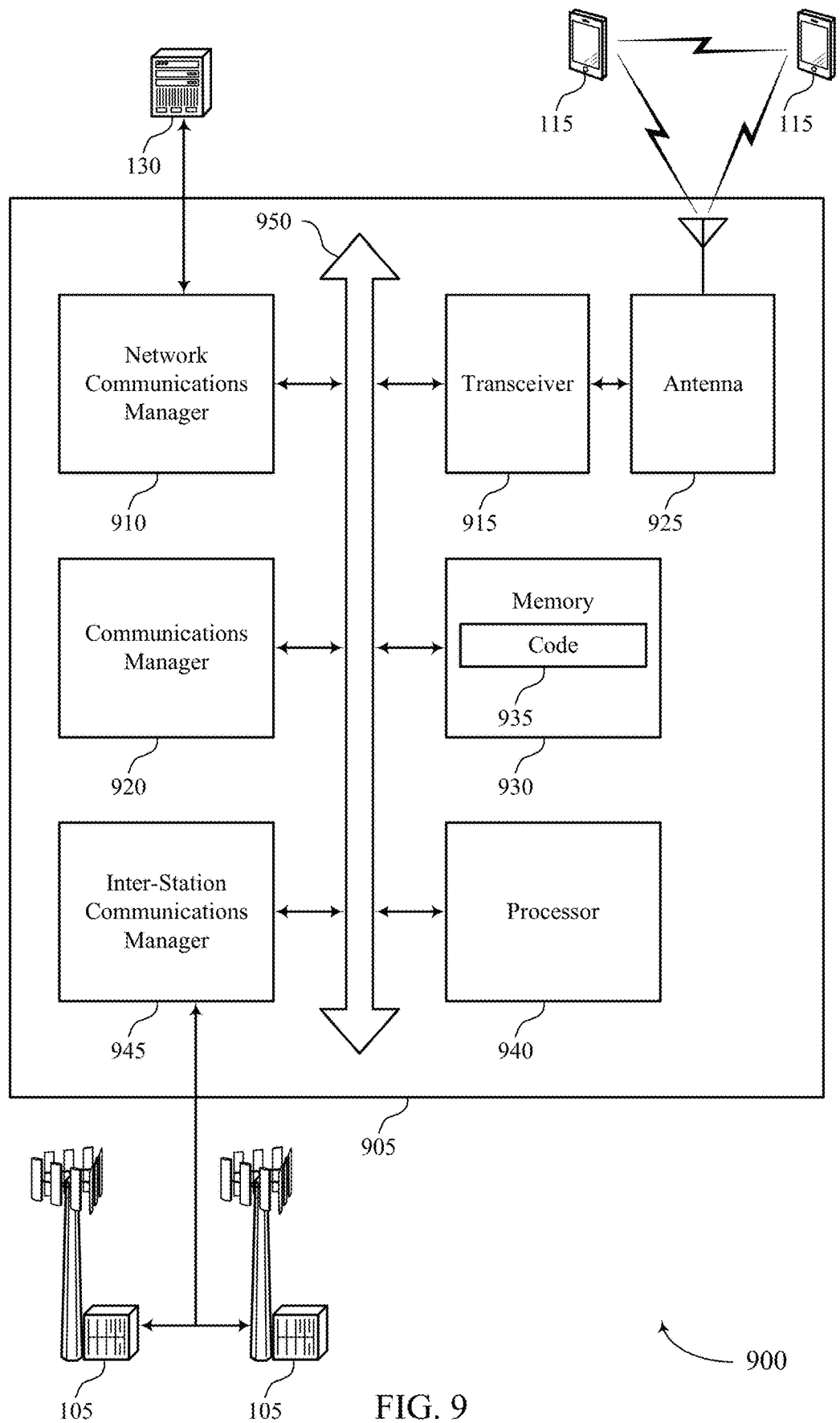
FIG. 9 shows a diagram of a system including a device that supports techniques for large round trip times in random access channel procedures in accordance with one or more aspects of the present disclosure.

FIG. 9 shows a diagram of a system 900 including a device 905 that supports techniques for large round trip times in random access channel procedures in accordance with aspects of the present disclosure. The device 905 may be an example of or include the components of a device 605, a device 705, or a base station 105 as described herein. The device 905 may communicate wirelessly with one or more base stations 105, UEs 115, or any combination thereof. The device 905 may include components for bi-directional voice and data communications including components for transmitting and receiving communications, such as a communications manager 920, a network communications manager 910, a transceiver 915, an antenna 925, a memory 930, code 935, a processor 940, and an inter-station communications manager 945. These components may be in electronic communication or otherwise coupled (e.g., operatively, communicatively, functionally, electronically, electrically) via one or more buses (e.g., a bus 950).

The network communications manager 910 may manage communications with a core network 130 (e.g., via one or more wired backhaul links). For example, the network communications manager 910 may manage the transfer of data communications for client devices, such as one or more UEs 115.

In some cases, the device 905 may include a single antenna 925. However, in some other cases the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic input/output system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for large round trip times in random access channel procedures). For example, the device 905 or a component of the device 905 may include a processor 940 and memory 930 coupled to the processor 940, the processor 940 and memory 930 configured to perform various functions described herein.

The inter-station communications manager 945 may manage communications with other base stations 105, and may include a controller or scheduler for controlling communications with UEs 115 in cooperation with other base stations 105. For example, the inter-station communications manager 945 may coordinate scheduling for transmissions to UEs 115 for various interference mitigation techniques such as beamforming or joint transmission. In some examples, the inter-station communications manager 945 may provide an X2 interface within an LTE/LTE-A wireless communications network technology to provide communication between base stations 105.

The communications manager 920 may support wireless communications at a first wireless device in accordance with examples as disclosed herein. For example, the communications manager 920 may be configured as or otherwise support a means for receiving a first message of a random access channel procedure from a second wireless device, the first message including a preamble having a cyclic prefix and a set of sequences. The communications manager 920 may be configured as or otherwise support a means for transmitting a second message of the random access channel procedure to the second wireless device, the second message indicating a first timing parameter for communications between the first wireless device and the second wireless device, the first timing parameter based on the preamble of the first message. The communications manager 920 may be configured as or otherwise support a means for transmitting a third message to the second wireless device indicating a second timing parameter.

Additionally or alternatively, the communications manager 920 may support wireless communications at a first wireless device in accordance with examples as disclosed herein. For example, the communications manager 920 may be configured as or otherwise support a means for receiving a first message of a random access channel procedure from a second wireless device, the first message including a preamble having a cyclic prefix and a set of sequences. The communications manager 920 may be configured as or otherwise support a means for transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for large round trip times in random access channel procedures as described herein, or the processor 940 and the memory 930 may be otherwise configured to perform or support such operations.

Figure 10:
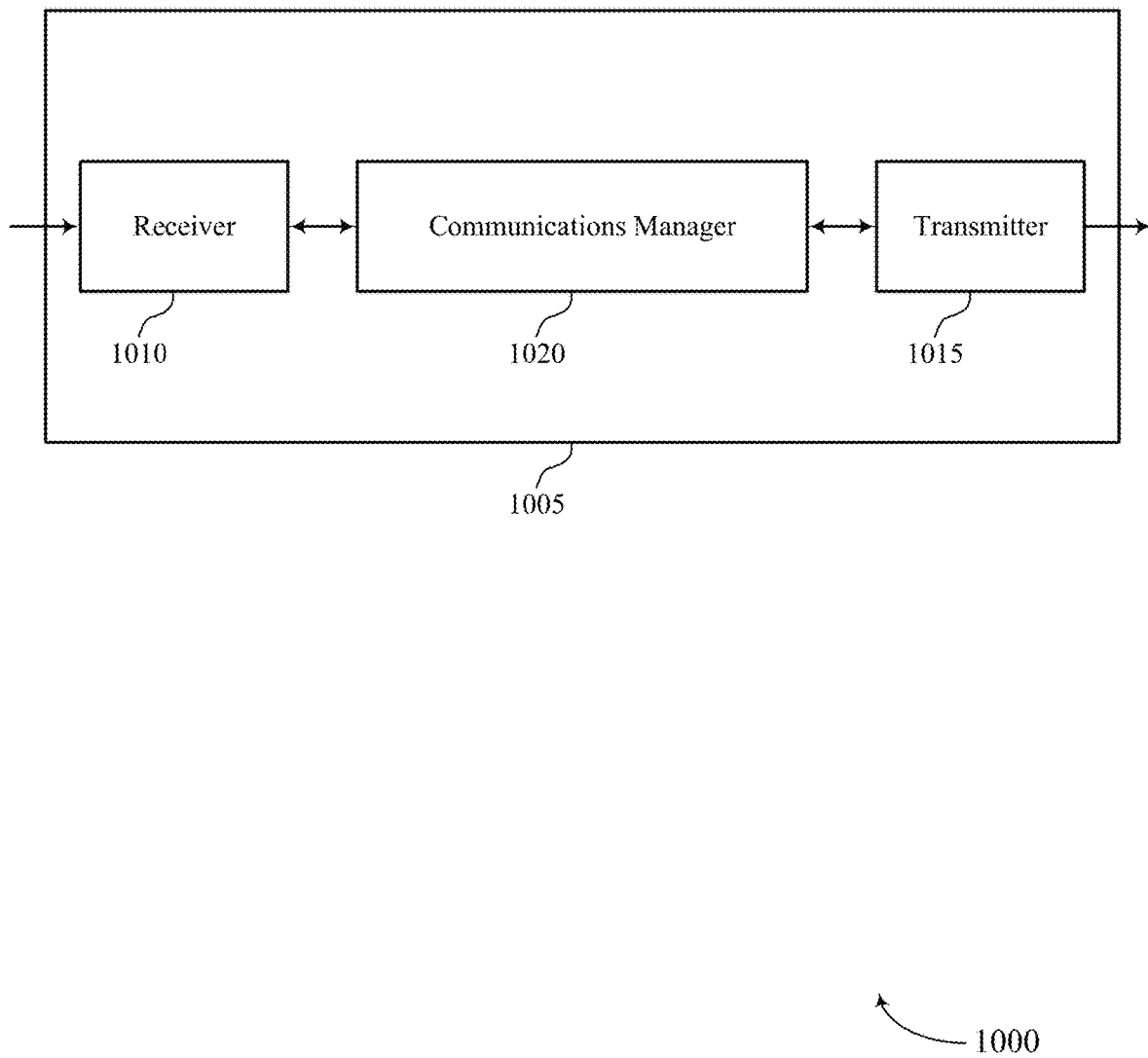
FIGS. 10 and 11 show block diagrams of devices that support techniques for large round trip times in random access channel procedures in accordance with one or more aspects of the present disclosure.

FIG. 10 shows a block diagram 1000 of a device 1005 that supports techniques for large round trip times in random access channel procedures in accordance with aspects of the present disclosure. The device 1005 may be an example of aspects of a UE 115 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for large round trip times in random access channel procedures). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for large round trip times in random access channel procedures). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for large round trip times in random access channel procedures as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a digital signal processor (DSP), an application-specific integrated circuit (ASIC), FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor.

If implemented in code executed by a processor, the functions of the communications manager 1020, the receiver 1010, the transmitter 1015, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communications at a second wireless device in accordance with examples as disclosed herein. For example, the communications manager 1020 may be configured as or otherwise support a means for transmitting a first message of a random access channel procedure to a first wireless device, the first message including a preamble having a cyclic prefix and a set of sequence. The communications manager 1020 may be configured as or otherwise support a means for receiving a second message of the random access channel procedure from the first wireless device, the second message indicating a first timing parameter for communications between the first wireless device and the second wireless device, the first timing parameter based on the preamble of the first message. The communications manager 1020 may be configured as or otherwise support a means for receiving a third message from the first wireless device indicating a second timing parameter.

Additionally or alternatively, the communications manager 1020 may support wireless communications at a second wireless device in accordance with examples as disclosed herein. For example, the communications manager 1020 may be configured as or otherwise support a means for receiving control signaling from a first wireless device indicating that a timing offset for a first message of a random access channel procedure is enabled. The communications manager 1020 may be configured as or otherwise support a means for transmitting, to the first wireless device, the first message of the random access channel procedure having the timing offset in response to receiving the control signaling, the first message including a preamble having a cyclic prefix and a set of sequences. The communications manager 1020 may be configured as or otherwise support a means for receiving a second message of the random access channel procedure from the first wireless device indicating a timing parameter based on transmitting the first message.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
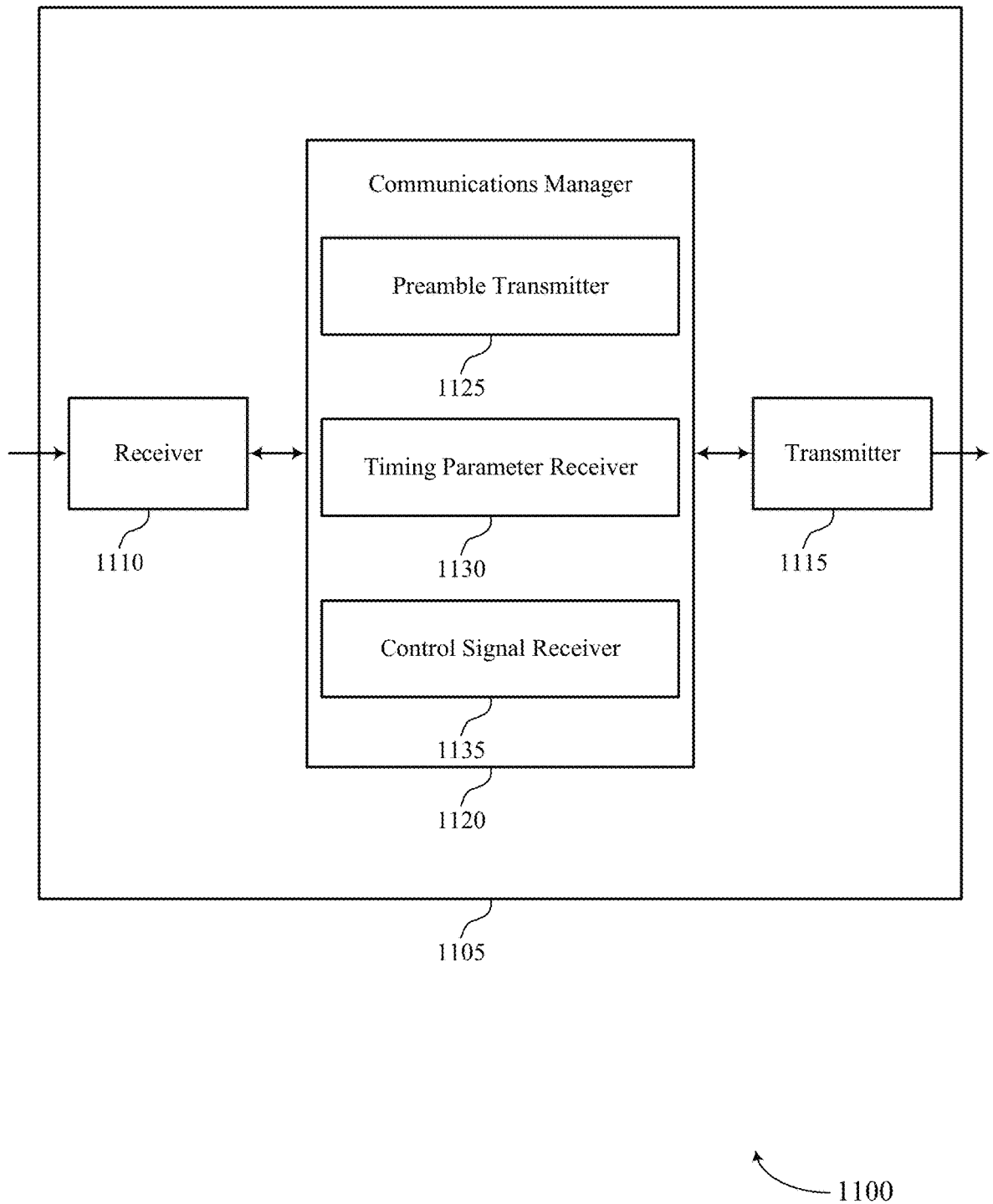

FIG. 11 shows a block diagram 1100 of a device 1105 that supports techniques for large round trip times in random access channel procedures in accordance with aspects of the present disclosure. The device 1105 may be an example of aspects of a device 1005 or a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for large round trip times in random access channel procedures). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for large round trip times in random access channel procedures). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for large round trip times in random access channel procedures as described herein. For example, the communications manager 1120 may include a preamble transmitter 1125, a timing parameter receiver 1130, a control signal receiver 1135, or any combination thereof. the communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at a second wireless device in accordance with examples as disclosed herein. the preamble transmitter 1125 may be configured as or otherwise support a means for transmitting a first message of a random access channel procedure to a first wireless device, the first message including a preamble having a cyclic prefix and a set of sequence. the timing parameter receiver 1130 may be configured as or otherwise support a means for receiving a second message of the random access channel procedure from the first wireless device, the second message indicating a first timing parameter for communications between the first wireless device and the second wireless device, the first timing parameter based on the preamble of the first message. The timing parameter receiver 1130 may be configured as or otherwise support a means for receiving a third message from the first wireless device indicating a second timing parameter.

Additionally or alternatively, the communications manager 1120 may support wireless communications at a second wireless device in accordance with examples as disclosed herein. The control signal receiver 1135 may be configured as or otherwise support a means for receiving control signaling from a first wireless device indicating that a timing offset for a first message of a random access channel procedure is enabled. The preamble transmitter 1125 may be configured as or otherwise support a means for transmitting, to the first wireless device, the first message of the random access channel procedure having the timing offset in response to receiving the control signaling, the first message including a preamble having a cyclic prefix and a set of sequences. The timing parameter receiver 1130 may be configured as or otherwise support a means for receiving a second message of the random access channel procedure from the first wireless device indicating a timing parameter based on transmitting the first message.

Figure 12:
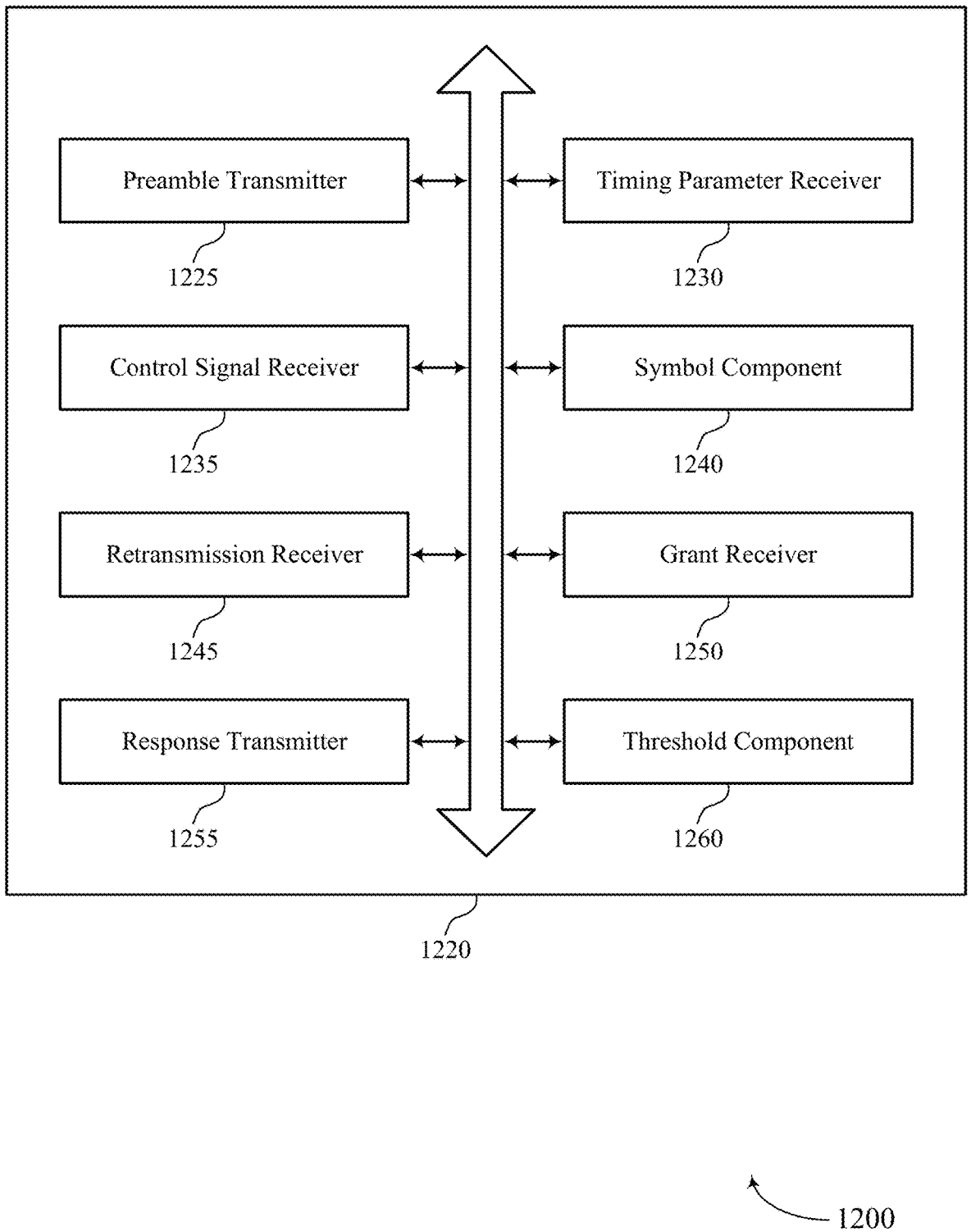
FIG. 12 shows a block diagram of a communications manager that supports techniques for large round trip times in random access channel procedures in accordance with one or more aspects of the present disclosure.

FIG. 12 shows a block diagram 1200 of a communications manager 1220 that supports techniques for large round trip times in random access channel procedures in accordance with aspects of the present disclosure. The communications manager 1220 may be an example of aspects of a communications manager 1020, a communications manager 1120, or both, as described herein. The communications manager 1220, or various components thereof, may be an example of means for performing various aspects of techniques for large round trip times in random access channel procedures as described herein. For example, the communications manager 1220 may include a preamble transmitter 1225, a timing parameter receiver 1230, a control signal receiver 1235, a symbol component 1240, a retransmission receiver 1245, a grant receiver 1250, a response transmitter 1255, a threshold component 1260, or any combination thereof. Each of these components may communicate, directly or indirectly, with one another (e.g., via one or more buses).

The communications manager 1220 may support wireless communications at a second wireless device in accordance with examples as disclosed herein. The preamble transmitter 1225 may be configured as or otherwise support a means for transmitting a first message of a random access channel procedure to a first wireless device, the first message including a preamble having a cyclic prefix and a set of sequence. The timing parameter receiver 1230 may be configured as or otherwise support a means for receiving a second message of the random access channel procedure from the first wireless device, the second message indicating a first timing parameter for communications between the first wireless device and the second wireless device, the first timing parameter based on the preamble of the first message. In some examples, the timing parameter receiver 1230 may be configured as or otherwise support a means for receiving a third message from the first wireless device indicating a second timing parameter.

In some examples, the first timing parameter corresponds to a first symbol associated with a first sequence of the set of sequences and the second timing parameter corresponds to a second symbol associated with a second sequence of the set of sequences.

In some examples, to support receiving the third message, the retransmission receiver 1245 may be configured as or otherwise support a means for receiving a retransmission of the second message of the random access channel procedure indicating the second timing parameter based on the first wireless device failing to receive a response to the second message.

In some examples, the response transmitter 1255 may be configured as or otherwise support a means for transmitting a response to the third message. In some examples, the retransmission receiver 1245 may be configured as or otherwise support a means for receiving a second retransmission of the second message of the random access channel procedure indicating a third timing parameter based on the first wireless device failing to receive the response to the third message.

In some examples, to support receiving the third message, the grant receiver 1250 may be configured as or otherwise support a means for receiving, from the first wireless device, a grant for a retransmission of the response to the second message based on the first wireless device failing to receive the response to the second message, the grant indicating the second timing parameter.

In some examples, the grant receiver 1250 may be configured as or otherwise support a means for receiving a second grant for a second retransmission of the response to the second message based on failing to receive the response to the third message, the second grant indicating a third timing parameter.

In some examples, to support receiving the third message, the response transmitter 1255 may be configured as or otherwise support a means for transmitting the response to the second message using the first timing parameter, where receiving the third message indicating the second timing parameter is based on transmitting the response to the second message using the first timing parameter.

In some examples, the third message includes a last message of the random access channel procedure. In some examples, receiving the response using the second timing parameter is based on one or more reference signals of the response.

In some examples, the response transmitter 1255 may be configured as or otherwise support a means for transmitting a response to the third message using the second timing parameter. In some examples, the timing parameter receiver 1230 may be configured as or otherwise support a means for receiving a fourth message from the first wireless device based on the first wireless device attempting to receive the response to the third message, the fourth message indicating a third timing parameter.

In some examples, the threshold component 1260 may be configured as or otherwise support a means for communicating one or more messages of the random access channel procedure via dedicated resources based on the second wireless device being a threshold distance from the first wireless device.

Additionally or alternatively, the communications manager 1220 may support wireless communications at a second wireless device in accordance with examples as disclosed herein. The control signal receiver 1235 may be configured as or otherwise support a means for receiving control signaling from a first wireless device indicating that a timing offset for a first message of a random access channel procedure is enabled. In some examples, the preamble transmitter 1225 may be configured as or otherwise support a means for transmitting, to the first wireless device, the first message of the random access channel procedure having the timing offset in response to receiving the control signaling, the first message including a preamble having a cyclic prefix and a set of sequences. In some examples, the timing parameter receiver 1230 may be configured as or otherwise support a means for receiving a second message of the random access channel procedure from the first wireless device indicating a timing parameter based on transmitting the first message.

In some examples, the grant receiver 1250 may be configured as or otherwise support a means for receiving a third message from the first wireless device indicating a second timing parameter, the third message including a grant for a retransmission of a response to the second message of the random access procedure. In some examples, the response transmitter 1255 may be configured as or otherwise support a means for transmitting the response using the timing offset, the timing parameter, the second timing parameter, or any combination thereof.

In some examples, the timing offset includes a symbol duration adjustment relative to a start of a first sequence of the set of sequences based on location information associated with the second wireless device. In some examples, the control signaling includes remaining minimum system information signaling.

Figure 13:
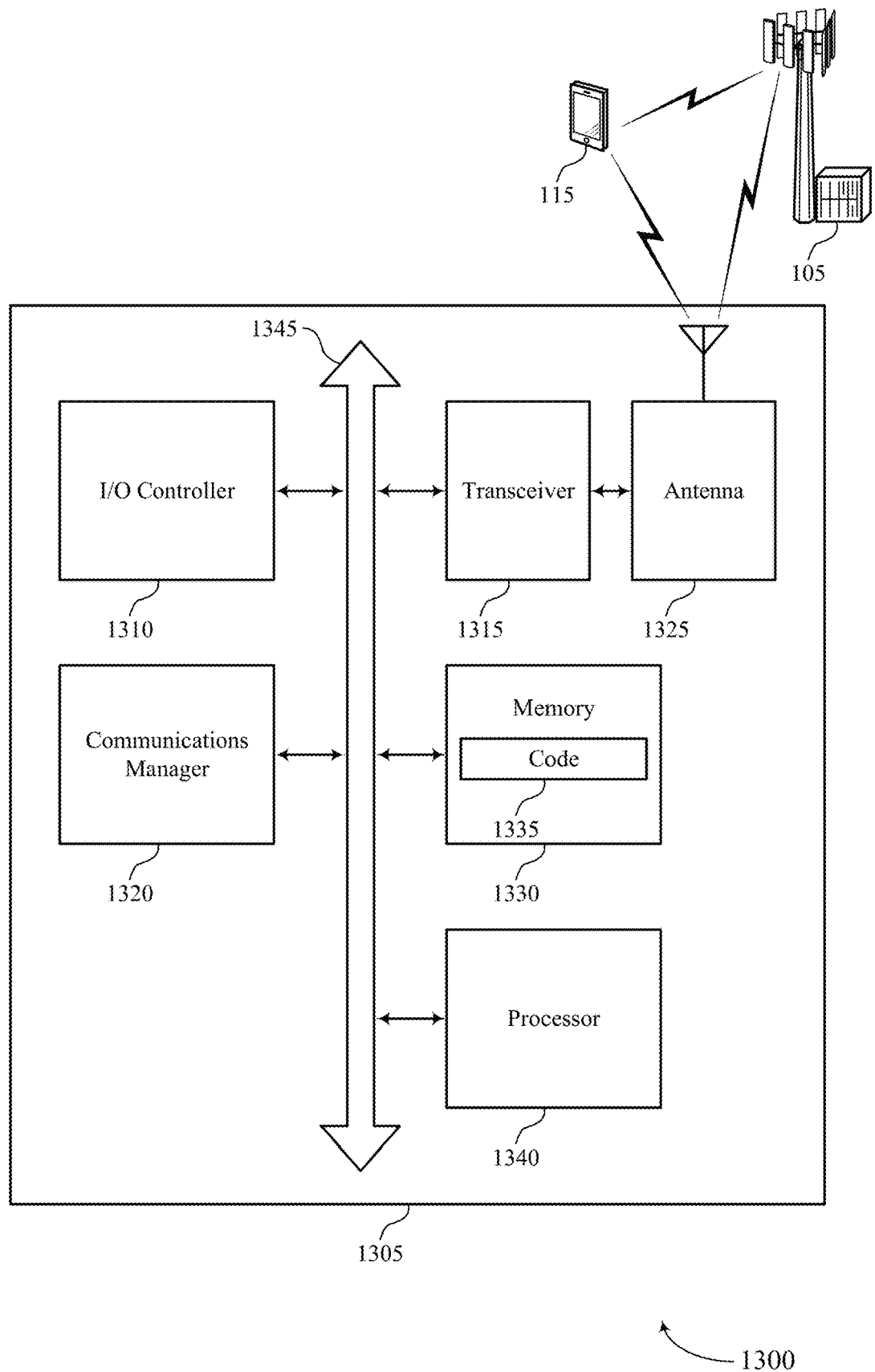
FIG. 13 shows a diagram of a system including a device that supports techniques for large round trip times in random access channel procedures in accordance with one or more aspects of the present disclosure.

FIG. 13 shows a diagram of a system 1300 including a device 1305 that supports techniques for large round trip times in random access channel procedures in accordance with aspects of the present disclosure. The device 1305 may be an example of or include the components of a device 1005, a device 1105, or a UE 115 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, an input/output (I/O) controller 1310, a transceiver 1315, an antenna 1325, a memory 1330, code 1335, and a processor 1340. These components may be in electronic communication or otherwise coupled (e.g., operatively, communicatively, functionally, electronically, electrically) via one or more buses (e.g., a bus 1345).

The I/O controller 1310 may manage input and output signals for the device 1305. The I/O controller 1310 may also manage peripherals not integrated into the device 1305. In some cases, the I/O controller 1310 may represent a physical connection or port to an external peripheral. In some cases, the I/O controller 1310 may utilize an operating system such as iOS®, ANDROID®, MS-DOS®, MS-WINDOWS®, OS/2®, UNIX®, LINUX®, or another known operating system. Additionally or alternatively, the I/O controller 1310 may represent or interact with a modem, a keyboard, a mouse, a touchscreen, or a similar device. In some cases, the I/O controller 1310 may be implemented as part of a processor, such as the processor 1340. In some cases, a user may interact with the device 1305 via the I/O controller 1310 or via hardware components controlled by the I/O controller 1310.

In some cases, the device 1305 may include a single antenna 1325. However, in some other cases, the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting techniques for large round trip times in random access channel procedures). For example, the device 1305 or a component of the device 1305 may include a processor 1340 and memory 1330 coupled to the processor 1340, the processor 1340 and memory 1330 configured to perform various functions described herein.

The communications manager 1320 may support wireless communications at a second wireless device in accordance with examples as disclosed herein. For example, the communications manager 1320 may be configured as or otherwise support a means for transmitting a first message of a random access channel procedure to a first wireless device, the first message including a preamble having a cyclic prefix and a set of sequence. The communications manager 1320 may be configured as or otherwise support a means for receiving a second message of the random access channel procedure from the first wireless device, the second message indicating a first timing parameter for communications between the first wireless device and the second wireless device, the first timing parameter based on the preamble of the first message. The communications manager 1320 may be configured as or otherwise support a means for receiving a third message from the first wireless device indicating a second timing parameter.

Additionally or alternatively, the communications manager 1320 may support wireless communications at a second wireless device in accordance with examples as disclosed herein. For example, the communications manager 1320 may be configured as or otherwise support a means for receiving control signaling from a first wireless device indicating that a timing offset for a first message of a random access channel procedure is enabled. The communications manager 1320 may be configured as or otherwise support a means for transmitting, to the first wireless device, the first message of the random access channel procedure having the timing offset in response to receiving the control signaling, the first message including a preamble having a cyclic prefix and a set of sequences. The communications manager 1320 may be configured as or otherwise support a means for receiving a second message of the random access channel procedure from the first wireless device indicating a timing parameter based on transmitting the first message.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for large round trip times in random access channel procedures as described herein, or the processor 1340 and the memory 1330 may be otherwise configured to perform or support such operations.

Figure 14:
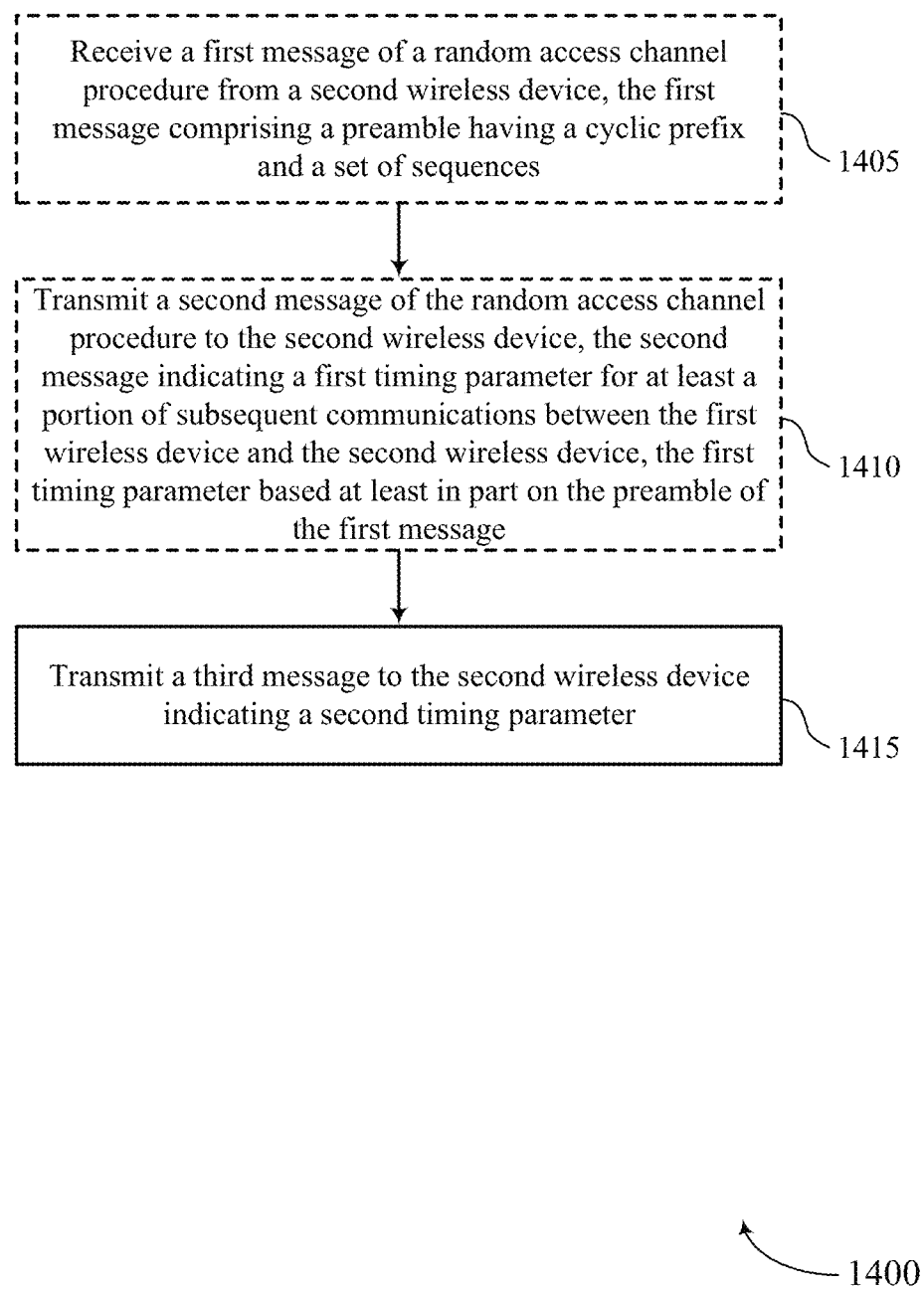
FIGS. 14 through 17 show flowcharts illustrating methods that support techniques for large round trip times in random access channel procedures in accordance with one or more aspects of the present disclosure.

FIG. 14 shows a flowchart illustrating a method 1400 that supports techniques for large round trip times in random access channel procedures in accordance with aspects of the present disclosure. The operations of the method 1400 may be implemented by a base station or its components as described herein. For example, the operations of the method 1400 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1405, the method may include receiving a first message of a random access channel procedure from a second wireless device, the first message including a preamble having a cyclic prefix and a set of sequences. The operations of 1405 may be performed in accordance with examples as disclosed herein. In some examples, aspects of the operations of 1405 may be performed by a Preamble Receiver 825 as described with reference to FIG. 8.

At 1410, the method may include transmitting a second message of the random access channel procedure to the second wireless device, the second message indicating a first timing parameter for at least a portion of subsequent communications between the first wireless device and the second wireless device, the first timing parameter based on the preamble of the first message. The operations of 1410 may be performed in accordance with examples as disclosed herein. In some examples, aspects of the operations of 1410 may be performed by a Timing Parameter Transmitter 830 as described with reference to FIG. 8.

At 1415, the method may include transmitting a third message to the second wireless device indicating a second timing parameter. The operations of 1415 may be performed in accordance with examples as disclosed herein. In some examples, aspects of the operations of 1415 may be performed by a Timing Parameter Transmitter 830 as described with reference to FIG. 8.

Figure 15:
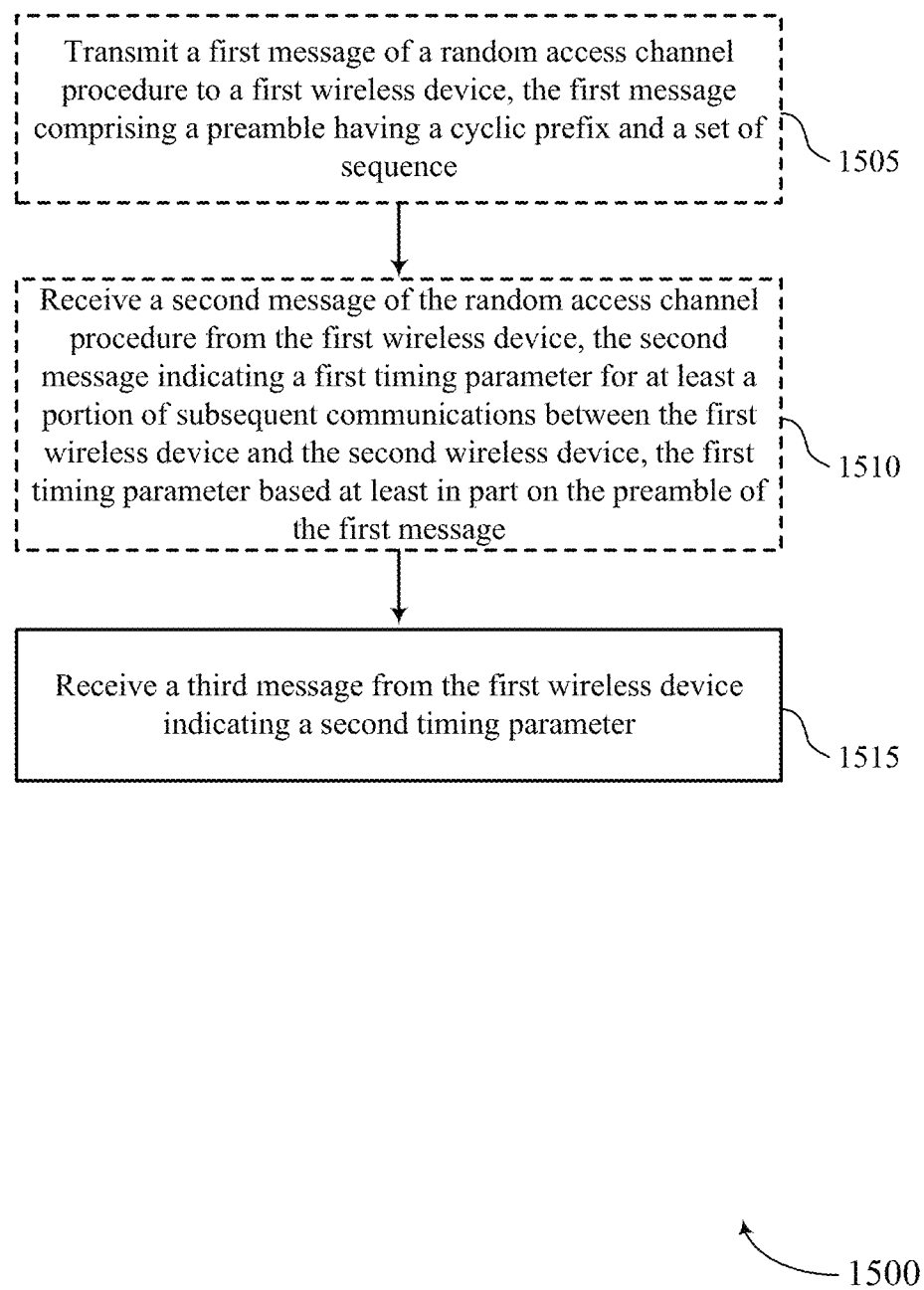

FIG. 15 shows a flowchart illustrating a method 1500 that supports techniques for large round trip times in random access channel procedures in accordance with aspects of the present disclosure. The operations of the method 1500 may be implemented by a UE or its components as described herein. For example, the operations of the method 1500 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1505, the method may include transmitting a first message of a random access channel procedure to a first wireless device, the first message including a preamble having a cyclic prefix and a set of sequence. The operations of 1505 may be performed in accordance with examples as disclosed herein. In some examples, aspects of the operations of 1505 may be performed by a Preamble Transmitter 1225 as described with reference to FIG. 12.

At 1510, the method may include receiving a second message of the random access channel procedure from the first wireless device, the second message indicating a first timing parameter for at least a portion of subsequent communications between the first wireless device and the second wireless device, the first timing parameter based on the preamble of the first message. The operations of 1510 may be performed in accordance with examples as disclosed herein. In some examples, aspects of the operations of 1510 may be performed by a Timing Parameter Receiver 1230 as described with reference to FIG. 12.

At 1515, the method may include receiving a third message from the first wireless device indicating a second timing parameter. The operations of 1515 may be performed in accordance with examples as disclosed herein. In some examples, aspects of the operations of 1515 may be performed by a Timing Parameter Receiver 1230 as described with reference to FIG. 12.

Figure 16:
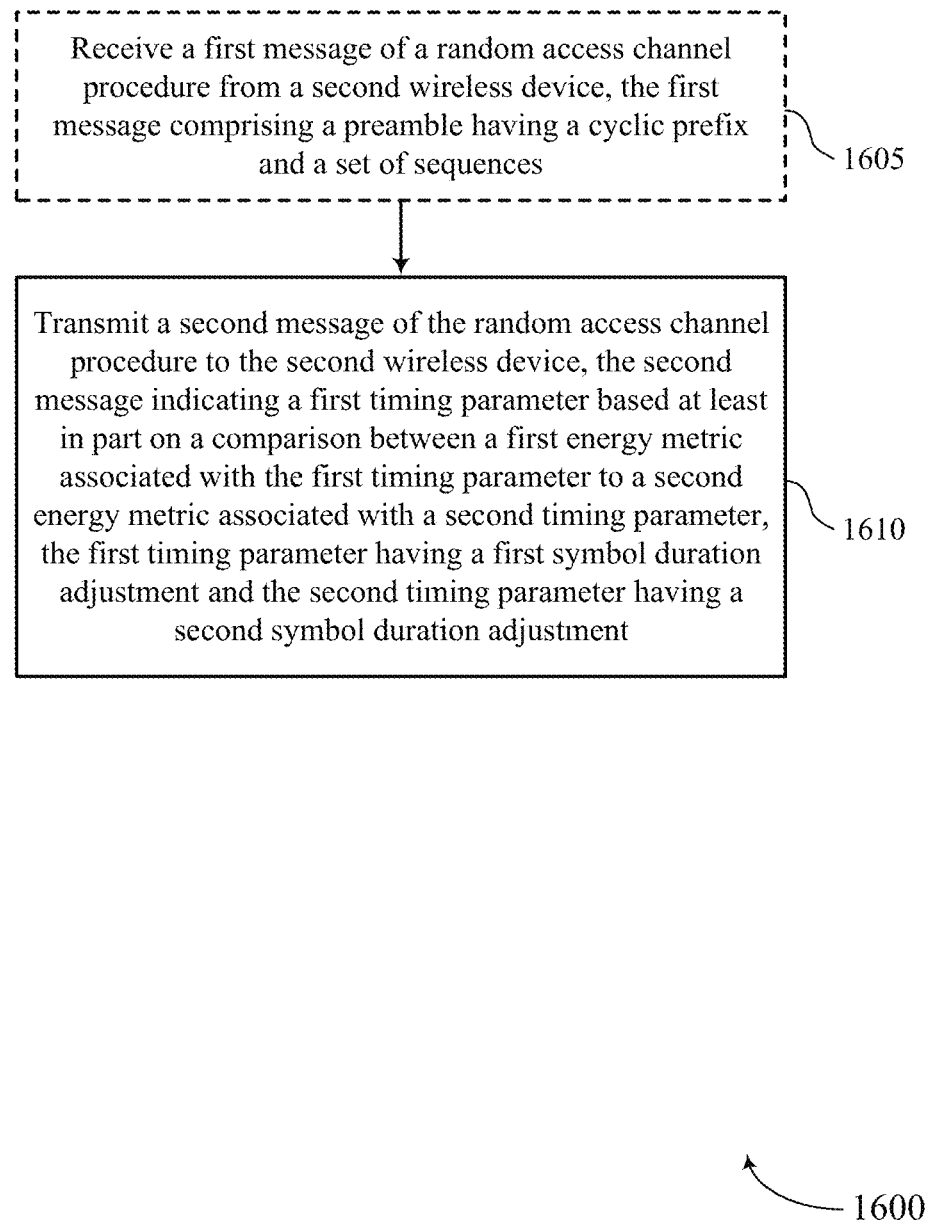

FIG. 16 shows a flowchart illustrating a method 1600 that supports techniques for large round trip times in random access channel procedures in accordance with aspects of the present disclosure. The operations of the method 1600 may be implemented by a base station or its components as described herein. For example, the operations of the method 1600 may be performed by a base station 105 as described with reference to FIGS. 1 through 9. In some examples, a base station may execute a set of instructions to control the functional elements of the base station to perform the described functions. Additionally or alternatively, the base station may perform aspects of the described functions using special-purpose hardware.

At 1605, the method may include receiving a first message of a random access channel procedure from a second wireless device, the first message including a preamble having a cyclic prefix and a set of sequences. The operations of 1605 may be performed in accordance with examples as disclosed herein. In some examples, aspects of the operations of 1605 may be performed by a Preamble Receiver 825 as described with reference to FIG. 8.

At 1610, the method may include transmitting a second message of the random access channel procedure to the second wireless device, the second message indicating a first timing parameter based on a comparison between a first energy metric associated with the first timing parameter to a second energy metric associated with a second timing parameter, the first timing parameter having a first symbol duration adjustment and the second timing parameter having a second symbol duration adjustment. The operations of 1610 may be performed in accordance with examples as disclosed herein. In some examples, aspects of the operations of 1610 may be performed by a Timing Parameter Transmitter 830 as described with reference to FIG. 8.

Figure 17:
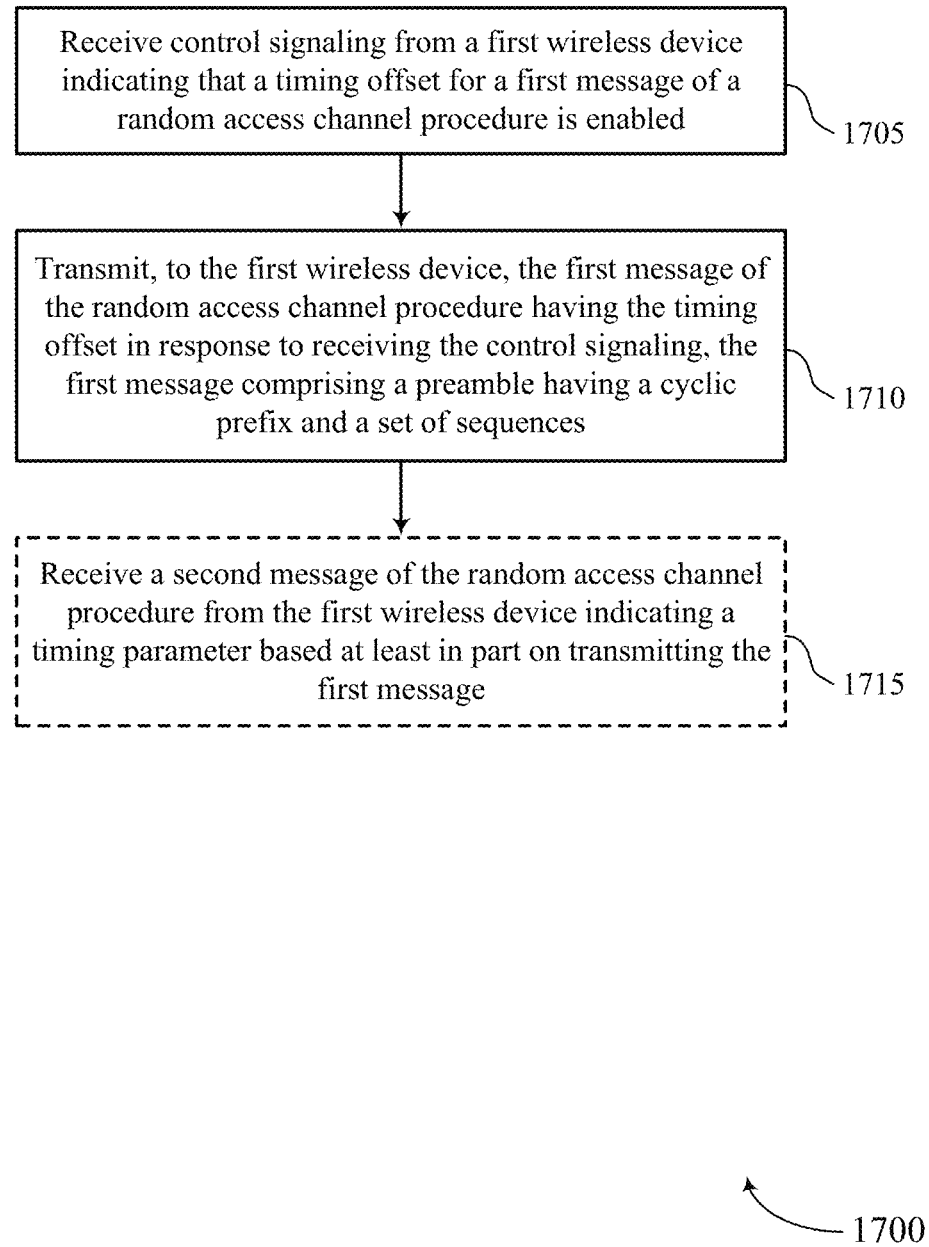

FIG. 17 shows a flowchart illustrating a method 1700 that supports techniques for large round trip times in random access channel procedures in accordance with aspects of the present disclosure. The operations of the method 1700 may be implemented by a UE or its components as described herein. For example, the operations of the method 1700 may be performed by a UE 115 as described with reference to FIGS. 1 through 5 and 10 through 13. In some examples, a UE may execute a set of instructions to control the functional elements of the UE to perform the described functions. Additionally or alternatively, the UE may perform aspects of the described functions using special-purpose hardware.

At 1705, the method may include receiving control signaling from a first wireless device indicating that a timing offset for a first message of a random access channel procedure is enabled. The operations of 1705 may be performed in accordance with examples as disclosed herein. In some examples, aspects of the operations of 1705 may be performed by a Control Signal Receiver 1235 as described with reference to FIG. 12.

At 1710, the method may include transmitting, to the first wireless device, the first message of the random access channel procedure having the timing offset in response to receiving the control signaling, the first message including a preamble having a cyclic prefix and a set of sequences. The operations of 1710 may be performed in accordance with examples as disclosed herein. In some examples, aspects of the operations of 1710 may be performed by a Preamble Transmitter 1225 as described with reference to FIG. 12.

At 1715, the method may include receiving a second message of the random access channel procedure from the first wireless device indicating a timing parameter based on transmitting the first message. The operations of 1715 may be performed in accordance with examples as disclosed herein. In some examples, aspects of the operations of 1715 may be performed by a Timing Parameter Receiver 1230 as described with reference to FIG. 12.

The following provides an overview of aspects of the present disclosure:

Aspect 1: A method for wireless communications at a first wireless device, comprising: receiving a first message of a random access channel procedure from a second wireless device, the first message comprising a preamble having a cyclic prefix and a set of sequences; transmitting a second message of the random access channel procedure to the second wireless device, the second message indicating a first timing parameter for at least a portion of subsequent communications between the first wireless device and the second wireless device, the first timing parameter based at least in part on the preamble of the first message; transmitting a third message to the second wireless device indicating a second timing parameter.

Aspect 2: The method of aspect 1, wherein the first timing parameter corresponds to a first symbol associated with a first sequence of the set of sequences and the second timing parameter corresponds to a second symbol associated with a second sequence of the set of sequences.

Aspect 3: The method of any of aspects 1 through 2, wherein transmitting the third message further comprises: retransmitting the second message of the random access channel procedure indicating the second timing parameter based at least in part on failing to receive a response to the second message.

Aspect 4: The method of aspect 3, further comprising: retransmitting the second message of the random access channel procedure indicating a third timing parameter based at least in part on failing to receive a response to the third message.

Aspect 5: The method of any of aspects 1 through 4, wherein transmitting the third message further comprises: transmitting, to the second wireless device, a grant for a retransmission of a response to the second message based at least in part on failing to receive the response to the second message, the grant indicating the second timing parameter.

Aspect 6: The method of aspect 5, further comprising: transmitting a second grant for a second retransmission of the response to the second message based at least in part on failing to receive the response to the third message, the second grant indicating a third timing parameter.

Aspect 7: The method of any of aspects 1 through 6, further comprising: receiving the response to the second message using the second timing parameter, wherein transmitting the third message indicating the second timing parameter is based at least in part on receiving the response to the second message using the second timing parameter.

Aspect 8: The method of aspect 7, wherein the third message comprises a last message of the random access channel procedure.

Aspect 9: The method of any of aspects 7 through 8, wherein receiving the response to the second message comprises: attempting to receive the response using the first timing parameter; and receiving the response using the second timing parameter based at least in part on failing to receive the response using the first timing parameter.

Aspect 10: The method of any of aspects 7 through 9, wherein receiving the response using the second timing parameter is based at least in part on one or more reference signals of the response.

Aspect 11: The method of any of aspects 1 through 10, further comprising: communicating one or more messages of the random access channel procedure via dedicated resources based at least in part on the second wireless device being a threshold distance from the first wireless device.

Aspect 12: A method for wireless communications at a second wireless device, comprising: transmitting a first message of a random access channel procedure to a first wireless device, the first message comprising a preamble having a cyclic prefix and a set of sequence; receiving a second message of the random access channel procedure from the first wireless device, the second message indicating a first timing parameter for subsequent communications between the first wireless device and the second wireless device, the first timing parameter based at least in part on the preamble of the first message; receiving a third message from the first wireless device based at least in part on the first wireless device attempting to receive a response to the second message, the third message indicating a second timing parameter.

Aspect 13: The method of aspect 12, wherein the first timing parameter corresponds to a first symbol associated with a first sequence of the set of sequences and the second timing parameter corresponds to a second symbol associated with a second sequence of the set of sequences.

Aspect 14: The method of any of aspects 12 through 13, wherein receiving the third message comprises: receiving a retransmission of the second message of the random access channel procedure indicating the second timing parameter based at least in part on the first wireless device failing to receive the response to the second message.

Aspect 15: The method of aspect 14, further comprising: transmitting a response to the third message; and receiving a second retransmission of the second message of the random access channel procedure indicating a third timing parameter based at least in part on the first wireless device failing to receive the response to the third message.

Aspect 16: The method of any of aspects 12 through 15, wherein receiving the third message comprises: receiving, from the first wireless device, a grant for a retransmission of the response to the second message based at least in part on the first wireless device failing to receive the response to the second message, the grant indicating the second timing parameter.

Aspect 17: The method of aspect 16, further comprising: receiving a second grant for a second retransmission of the response to the second message based at least in part on failing to receive the response to the third message, the second grant indicating a third timing parameter.

Aspect 18: The method of any of aspects 12 through 17, wherein receiving the third message comprises: transmitting the response to the second message using the first timing parameter, wherein receiving the third message indicating the second timing parameter is based at least in part on transmitting the response to the second message using the first timing parameter.

Aspect 19: The method of aspect 18, wherein the third message comprises a last message of the random access channel procedure.

Aspect 20: The method of any of aspects 18 through 19, wherein receiving the response using the second timing parameter is based at least in part on one or more reference signals of the response.

Aspect 21: The method of any of aspects 18 through 20, further comprising: transmitting a response to the third message using the second timing parameter; and receiving a fourth message from the first wireless device based at least in part on whether the first wireless device receives the response to the third message, the fourth message indicating a third timing parameter.

Aspect 22: The method of any of aspects 12 through 21, further comprising: communicating one or more messages of the random access channel procedure via dedicated resources based at least in part on the second wireless device being a threshold distance from the first wireless device.

Aspect 23: A method for wireless communications at a first wireless device, comprising: receiving a first message of a random access channel procedure from a second wireless device, the first message comprising a preamble having a cyclic prefix and a set of sequences; and transmitting a second message of the random access channel procedure to the second wireless device, the second message indicating a first timing parameter based at least in part on a comparison between a first energy metric associated with the first timing parameter to a second energy metric associated with a second timing parameter, the first timing parameter having a first symbol duration adjustment and the second timing parameter having a second symbol duration adjustment.

Aspect 24: The method of aspect 23, wherein the first symbol duration adjustment corresponds to a first sequence of the set of sequences and the second symbol duration adjustment correspond to a second sequence of the set of sequences.

Aspect 25: The method of any of aspects 23 through 24, further comprising: receiving the first message using the first timing parameter having the first symbol duration adjustment to obtain the first energy metric; and receiving the first message using the second timing parameter having the second symbol duration adjustment to obtain the second energy metric.

Aspect 26: The method of any of aspects 23 through 25, further comprising: communicating one or more messages of the random access channel procedure via dedicated resources based at least in part on the second wireless device being a threshold distance from the first wireless device.

Aspect 27: A method for wireless communications at a second wireless device, comprising: receiving control signaling from a first wireless device indicating that a timing offset for a first message of a random access channel procedure is enabled; transmitting, to the first wireless device, the first message of the random access channel procedure having the timing offset in response to receiving the control signaling, the first message comprising a preamble having a cyclic prefix and a set of sequences; and receiving a second message of the random access channel procedure from the first wireless device indicating a timing parameter based at least in part on transmitting the first message.

Aspect 28: The method of aspect 27, further comprising: receiving a third message from the first wireless device indicating a second timing parameter, the third message comprising a grant for a retransmission of a response to the second message of the random access procedure; and transmitting the response using the timing offset, the timing parameter, the second timing parameter, or any combination thereof.

Aspect 29: The method of any of aspects 27 through 28, wherein the timing offset comprises a symbol duration adjustment relative to a start of a first sequence of the set of sequences based at least in part on location information associated with the second wireless device.

Aspect 30: The method of any of aspects 27 through 29, wherein the control signaling comprises remaining minimum system information signaling.

Aspect 31: An apparatus for wireless communications at a first wireless device, comprising a processor; and memory coupled to the processor, the processor and memory configured to perform a method of any of aspects 1 through 11.

Aspect 32: An apparatus for wireless communications at a first wireless device, comprising at least one means for performing a method of any of aspects 1 through 11.

Aspect 33: A non-transitory computer-readable medium storing code for wireless communications at a first wireless device, the code comprising instructions executable by a processor to perform a method of any of aspects 1 through 11.

Aspect 34: An apparatus for wireless communications at a second wireless device, comprising a processor; and memory coupled to the processor, the processor and memory configured to perform a method of any of aspects 12 through 22.

Aspect 35: An apparatus for wireless communications at a second wireless device, comprising at least one means for performing a method of any of aspects 12 through 22.

Aspect 36: A non-transitory computer-readable medium storing code for wireless communications at a second wireless device, the code comprising instructions executable by a processor to perform a method of any of aspects 12 through 22.

Aspect 37: An apparatus for wireless communications at a first wireless device, comprising a processor; and memory coupled to the processor, the processor and memory configured to perform a method of any of aspects 23 through 26.

Aspect 38: An apparatus for wireless communications at a first wireless device, comprising at least one means for performing a method of any of aspects 23 through 26.

Aspect 39: A non-transitory computer-readable medium storing code for wireless communications at a first wireless device, the code comprising instructions executable by a processor to perform a method of any of aspects 23 through 26.

Aspect 40: An apparatus for wireless communications at a second wireless device, comprising a processor; and memory coupled to the processor, the processor and memory configured to perform a method of any of aspects 27 through 30.

Aspect 41: An apparatus for wireless communications at a second wireless device, comprising at least one means for performing a method of any of aspects 27 through 30.

Aspect 42: A non-transitory computer-readable medium storing code for wireless communications at a second wireless device, the code comprising instructions executable by a processor to perform a method of any of aspects 27 through 30.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A first wireless device for wireless communications, comprising:
    a processor; and
    memory coupled to the processor, the processor and memory configured to:
        receive a first message of a random access channel procedure from a second wireless device, the first message comprising a preamble having a cyclic prefix and a set of sequences;
        transmit a second message of the random access channel procedure to the second wireless device, the second message indicating a first timing parameter for at least a portion of subsequent communications between the first wireless device and the second wireless device, the first timing parameter based at least in part on the preamble of the first message; and
        transmit a third message to the second wireless device indicating a second timing parameter.

2. The first wireless device of claim 1, wherein the first timing parameter corresponds to a first symbol associated with a first sequence of the set of sequences and the second timing parameter corresponds to a second symbol associated with a second sequence of the set of sequences.

3. The first wireless device of claim 1, wherein, to transmit the third message, the processor and memory are configured to:
    retransmit the second message of the random access channel procedure indicating the second timing parameter based at least in part on failing to receive a response to the second message.

4. The first wireless device of claim 3, wherein the processor and memory are further configured to:
    retransmit the second message of the random access channel procedure indicating a third timing parameter based at least in part on failing to receive a response to the third message.

5. The first wireless device of claim 1, wherein, to transmit the third message, the processor and memory are configured to:
    transmit, to the second wireless device, a grant for a retransmission of a response to the second message based at least in part on failing to receive the response to the second message, the grant indicating the second timing parameter.

6. The first wireless device of claim 5, wherein the processor and memory are further configured to:
    transmit a second grant for a second retransmission of the response to the second message based at least in part on failing to receive the response to the third message, the second grant indicating a third timing parameter.

7. The first wireless device of claim 1, wherein the processor and memory are further configured to:
    receive a response to the second message using the second timing parameter, wherein transmitting the third message indicating the second timing parameter is based at least in part on receiving the response to the second message using the second timing parameter.

8. The first wireless device of claim 7, wherein the third message comprises a last message of the random access channel procedure.

9. The first wireless device of claim 7, wherein, to receive the response to the second message, the processor and memory are configured to:
    attempt to receive the response using the first timing parameter; and
    receive the response using the second timing parameter based at least in part on failing to receive the response using the first timing parameter.

10. The first wireless device of claim 7, wherein, to receive the response to the second message, the processor and memory are configured to:
    receive the response using the second timing parameter based at least in part on one or more reference signals of the response.

11. The first wireless device of claim 1, wherein the processor and memory are further configured to:
    communicate one or more messages of the random access channel procedure via dedicated resources based at least in part on the second wireless device being a threshold distance from the first wireless device.

12. A method for wireless communications at a first wireless device, comprising:
    receiving a first message of a random access channel procedure from a second wireless device, the first message comprising a preamble having a cyclic prefix and a set of sequences;
    transmitting a second message of the random access channel procedure to the second wireless device, the second message indicating a first timing parameter for at least a portion of subsequent communications between the first wireless device and the second wireless device, the first timing parameter based at least in part on the preamble of the first message; and
    transmitting a third message to the second wireless device indicating a second timing parameter.

13. The method of claim 12, wherein the first timing parameter corresponds to a first symbol associated with a first sequence of the set of sequences and the second timing parameter corresponds to a second symbol associated with a second sequence of the set of sequences.

14. The method of claim 12, wherein transmitting the third message comprises:
    retransmitting the second message of the random access channel procedure indicating the second timing parameter based at least in part on failing to receive a response to the second message.

15. The method of claim 14, further comprising:
    retransmitting the second message of the random access channel procedure indicating a third timing parameter based at least in part on failing to receive a response to the third message.

16. The method of claim 12, wherein transmitting the third message comprises:
    transmitting, to the second wireless device, a grant for a retransmission of a response to the second message based at least in part on failing to receive the response to the second message, the grant indicating the second timing parameter.

17. The method of claim 16, further comprising:
transmitting a second grant for a second retransmission of the response to the second message based at least in part on failing to receive the response to the third message, the second grant indicating a third timing parameter.

18. The method of claim 12, further comprising:
receiving a response to the second message using the second timing parameter, wherein transmitting the third message indicating the second timing parameter is based at least in part on receiving the response to the second message using the second timing parameter.

19. The method of claim 18, wherein the third message comprises a last message of the random access channel procedure.

20. The method of claim 18, wherein receiving the response to the second message comprises:
attempting to receive the response using the first timing parameter; and
receiving the response using the second timing parameter based at least in part on failing to receive the response using the first timing parameter.

21. The method of claim 18, wherein receiving the response to the second message comprises:
receiving the response using the second timing parameter based at least in part on one or more reference signals of the response.

22. The method of claim 12, further comprising:
communicating one or more messages of the random access channel procedure via dedicated resources based at least in part on the second wireless device being a threshold distance from the first wireless device.

23. A non-transitory computer-readable medium storing code for wireless communication at a first wireless device, the code comprising instructions executable by one or more processors to:
receive a first message of a random access channel procedure from a second wireless device, the first message comprising a preamble having a cyclic prefix and a set of sequences;
transmit a second message of the random access channel procedure to the second wireless device, the second message indicating a first timing parameter for at least a portion of subsequent communications between the first wireless device and the second wireless device, the first timing parameter based at least in part on the preamble of the first message; and
transmit a third message to the second wireless device indicating a second timing parameter.

24. The non-transitory computer-readable medium of claim 23, wherein the first timing parameter corresponds to a first symbol associated with a first sequence of the set of sequences and the second timing parameter corresponds to a second symbol associated with a second sequence of the set of sequences.

25. The non-transitory computer-readable medium of claim 23, wherein the instructions to transmit the third message are executable by the one or more processors to:
retransmit the second message of the random access channel procedure indicating the second timing parameter based at least in part on failing to receive a response to the second message.

26. The non-transitory computer-readable medium of claim 25, wherein the instructions are further executable by the one or more processors to:
retransmit the second message of the random access channel procedure indicating a third timing parameter based at least in part on failing to receive a response to the third message.

27. A first wireless device for wireless communication, comprising:
means for receiving a first message of a random access channel procedure from a second wireless device, the first message comprising a preamble having a cyclic prefix and a set of sequences;
means for transmitting a second message of the random access channel procedure to the second wireless device, the second message indicating a first timing parameter for at least a portion of subsequent communications between the first wireless device and the second wireless device, the first timing parameter based at least in part on the preamble of the first message; and
means for transmitting a third message to the second wireless device indicating a second timing parameter.

28. The first wireless device of claim 27, wherein the first timing parameter corresponds to a first symbol associated with a first sequence of the set of sequences and the second timing parameter corresponds to a second symbol associated with a second sequence of the set of sequences.

29. The first wireless device of claim 27, wherein the means for transmitting the third message comprise:
retransmitting the second message of the random access channel procedure indicating the second timing parameter based at least in part on failing to receive a response to the second message.

30. The first wireless device of claim 29, further comprising:
means for retransmitting the second message of the random access channel procedure indicating a third timing parameter based at least in part on failing to receive a response to the third message.

* * * * *